(12) United States Patent
Naruo et al.

(10) Patent No.: US 6,324,078 B1
(45) Date of Patent: Nov. 27, 2001

(54) POWER SOURCE DEVICE

(75) Inventors: Masahiro Naruo; Takashi Kanda; Masahito Ohnishi; Kazuhiro Hori; Kazuo Yoshida, all of Kadoma (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/694,012

(22) Filed: Oct. 23, 2000

(30) Foreign Application Priority Data

Oct. 26, 1999 (JP) .................................................. 11-304081

(51) Int. Cl.⁷ ........................... H02M 3/335; H02M 7/00; H02M 7/68; H02M 7/44
(52) U.S. Cl. ................. 363/17; 363/98; 363/124
(58) Field of Search .................................. 363/17, 37, 98, 363/132, 124

(56) References Cited

U.S. PATENT DOCUMENTS

| 5,063,490 | | 11/1991 | Maehara et al. ........................ 363/37 |
| 5,434,479 | * | 7/1995 | Ohnishi et al. .................. 315/209 R |
| 5,541,829 | * | 7/1996 | Machara et al. ........................ 363/34 |
| 5,621,621 | * | 4/1997 | Lilliestrale .............................. 363/17 |
| 5,777,861 | * | 7/1998 | Shimizu et al. ........................ 363/37 |
| 6,064,584 | * | 5/2000 | Cornec et al. .......................... 363/95 |
| 6,075,715 | * | 6/2000 | Machara et al. ....................... 363/37 |
| 6,172,882 | * | 1/2001 | Tanaka et al. .......................... 363/17 |

FOREIGN PATENT DOCUMENTS 5-88067   12/1993   (JP) ................................ H02M/7/48

* cited by examiner

Primary Examiner—Peter S. Wong
Assistant Examiner—Bao Q. Vu
(74) Attorney, Agent, or Firm—Burns, Doane, Swecker & Mathis, LLP

(57) ABSTRACT

A power source device includes a control circuit which controls switching elements in full-bridge arrangement so as, in decreasing an output to a load, to substantially equalize ON timing of one of two switching elements at diagonal position to the other of them with ON period of the one switching element shortened, that is, with ON duty ratio of the one switching element decreased. Switching operation of the elements in this event is not made to be in the hard switching operation, and a range in which the output to load can be controlled without increasing any stress or noise is thereby broadened, whereby it is enabled to minimize varying width of switching frequency and to attain a wide range control of the output to load without causing any one of the switching elements to be in the hard switching operation.

15 Claims, 27 Drawing Sheets

FIG. 33
FIG. 34
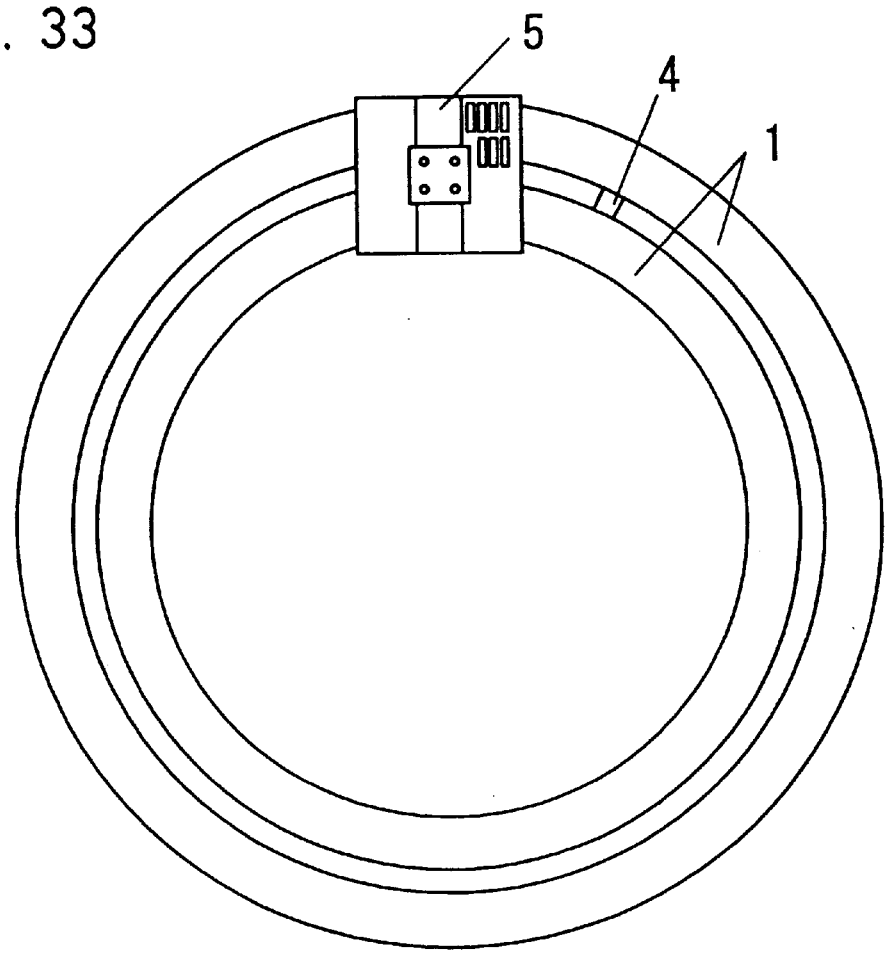
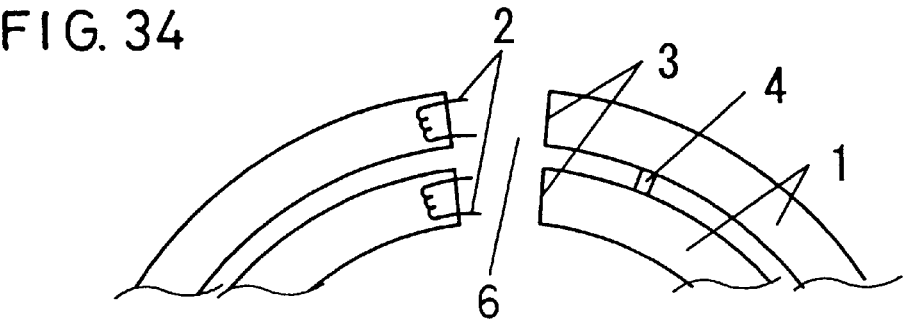

POWER SOURCE DEVICE

BACKGROUND OF THE INVENTION

This invention relates to power source devices for supplying a high frequency power from commercial power sources to loads.

DESCRIPTION OF RELATED ART

Examples of the power source device of the kind referred to have been described in U.S. Pat. No. 5,063,490 to Maehara et al., assignors to the same assignee as the present invention, Japanese Patent Publication No. 5-88067 and so on. Maehara et al. disclose a device comprising an inverter circuit of a full bridge arrangement of a plurality of pairs of such switching elements as power MOSFET's and a plurality of parasitic diodes respectively connected between drain and source of each switching element, and a resonance load circuit of an inductor, capacitor and discharge lamp and connected between a junction point of one of the pair of the switching elements and a junction point of another pair of the switching elements. One switching element is connected at the drain to the cathode of one diode which is connected at the anode to the cathode of another diode, and this another diode is connected at the anode to the source of the one switching element. The junction point of the plurality of the switching elements is connected to one end of a commercial power source, and the other end of this power source is connected through two inductors to a junction point of further diodes. A capacitor is connected between a junction point of these inductors and the one end of the power source, and an AC filter is formed by this capacitor and one of these inductors.

A driving signal of a square wave is input across the gate and source of one switching element in one of the pairs, and another square wave driving signal is input across the gate and source of the other switching element in the same pair, so that the switching elements in the pair will be alternately turned ON and OFF. Further, the same square wave driving signal as that to the other switching element of the one pair is input to one switching element in the other pair, and the same signal as that to the one switching element of the one pair is input to the other switching element of the other pair, so that the other switching element of the other pair will be turned ON and OFF simultaneously with the other element of the one pair and the one switching element of the other pair will be turned ON and OFF simultaneously with the one element of the one pair.

In this circuit according to Maehara et al., the switching elements of one of the pairs in the inverter circuit are acting in common as switching elements in a chopper so as to form the device with a fewer number of elements, and there arise advantages that power loss is reduced, and that required circuit structure can be also simplified. Further, as the respective switching elements of each pair are made to act alternately as the elements of the chopper and of the inverter in every half cycle of the commercial source voltage, there arises further advantage that any stress per each switching element can be reduced. As the respective switching elements in each pair are well balanced in the power loss, it is enabled to employ the same structure for heat radiation, for example, in respect of the respective elements. Since the respective switching elements in the one pair are operating commonly as the elements of the chopper and inverter, further, it is made unnecessary to provide a separate chopper driving circuit, while the required driving circuit itself can be simplified in the structure. The insertion of the AC filter comprising one of the two inductors and the capacitor between the commercial power source and the inductors renders the input current to be continuous so as to be able to reduce input current distortion factor and, as the input current can be made to be of a sinusoidal wave of the same phase as the input voltage, it is possible to render the input power factor substantially to be 1.

In addition, Maehara et al. are providing a system for intermittently stopping the switching elements capable of controlling the input, in correspondence to the power source polarity detected by a source polarity detecting means. In concrete, the operation of the one switching element in one pair is intermittently stopped when the polarity of the commercial power source is positive. When the source power polarity is negative, to the contrary, the operation of the other switching element in the one pair is intermittently stopped. With the operation of the switching elements in one pair capable of controlling the input stopped intermittently in this manner, the power supply from the commercial power source can be freely reduced, and the voltage of the smoothing capacitor can be prevented from increasing due to an excessive supply of power.

SUMMARY OF THE INVENTION

In the foregoing power source device according to Maehara etal., the provision of the power conversion circuit constituted by the inverter of full bridge arrangement with the switching frequency of the inverter made variable renders the output to the load to be controllable.

However, when the switching frequency is varied in the case when the DC power is prepared by rectifying and smoothing the commercial source power, there occurs a problem that the high frequency leaks on to the side of the commercial power source, upon which it becomes necessary to provide a filter for preventing the high frequency from leaking to, for example, input end of the diode bridge for rectifying the commercial source power. In performing the control of the output to load (hereinafter "the load output") over a wide range, further, it is required to control the switching frequency of the switching element over a wide range, and there arises a problem that required design of the filter for restraining such harmonic distortion becomes complicated.

In recent years, further, there has been provided straight or circular tube lamps of T5 type made thin to be 16 mm in the tube diameter from the view point of resource saving and energy reduction, as well as a high output discharge lamp thin to be about 18 to 29 mm in the tube diameter and long to be 1400 to 2500 mm in light path length. When, for example, as shown in FIGS. 33 and 34, a plurality of circular light emitting tubes 1 having at one end a filament electrode 2 and closed at the other end 3 are arranged concentrically and these circular light emitting tubes 1 are joined at portions adjacent to the closed ends 3 by means of a junction point 4, there is formed a single discharge path in their interior. At the same time, the coldest point 6 is formed at the closed ends, bases 5 are fitted to enclose both ends of the circular light emitting tubes 1, and a double tube type fluorescent lamp is provided.

These discharge lamps of the type referred to are made thinner in the tube diameter in order to improve the lamp efficiency, and the lamp current is made smaller but the lamp voltage is made higher relatively to various general use fluorescent lamps. Further, as the highly efficient discharge lamps of this kind are smaller in the tube diameter than conventional discharge lamps, spatial allowance for disposing the filament electrode 2 is small. Consequently, the filament electrode 2 is minimized in size, while a high precision control of preheating current for preventing the filament from being damaged becomes necessary, and the filament current at lighting is also subjected to a control. In an event when a preheating system in which a capacitor is connected between non-source side ends of a pair of the filament electrodes is employed (preheating circuit using one capacitor), the filament current at lighting becomes larger as the lamp voltage increases with the capacitor made constant in the capacity and as the frequency of the filament current, that is, the switching frequency of the switching elements becomes higher. In the case where the load is the discharge lamp, the dimming increased causes the lamp voltage to increase, so that the filament current at lighting decreased renders the switching frequency to be hard to be set relatively high, and there occurs a problem that the range in which the load output can be controlled only with the switching frequency is limited.

In the case where the load is a high pressure discharge lamp, further a wide range control of the switching frequency of the switching elements for controlling the output causes the lamp to generate an acoustic resonance, and there has been a problem that the operation in a specific frequency band has to be avoided.

A possible measure for controlling the output without varying the switching frequency would be to vary the ON period of the switching elements. In order to adjust the load output over a wide range, however, it is required to remarkably vary the ON period of the switching element, so that, in the event of the so-called hard switching operation (a switching causing a spike current to flow due to an influence of the parasitic capacity) starting with a positive current upon turning ON of the particular switching element, a spike current will flow at the moment of ON of the switching element, and the stress or noise grows. It has been difficult to control the load output over the wide range while controlling all of the switching elements so as not to cause such hard switching operation to occur.

The present invention has been suggested in order to overcome such problems as has been described, and it is an object of the invention to provide a power source device employing an inverter of a full bridge arrangement, which allows a wide range control of the load output by minimizing the varying width of the switching frequency and rendering all switching elements not to be in the hard switching operation. Further, it is another object of the present invention to provide a power source device of the circuit arrangement employing part of the switching elements commonly as part of the chopper and inverter, in which a voltage of smoothing capacitor can be controlled even upon controlling the load output.

According to the present invention, the foregoing objects can be established by a power source device wherein two series circuits respectively of two switching elements are connected in parallel to a smoothing capacitor, a resonance load circuit comprising at least an LC resonance circuit and a load is connected between both junction points of the switching elements in each of the two parallel circuits, a series circuit of a rectifying circuit for rectifying a source power from a commercial power source and an inductance is connected across an optional one of the switching elements in one series circuit to employ the optional switching element as a chopper-common switching element performing a switching operation which causes a chopper operation enabled, and a chopper diode is connected in inverse parallel to the other switching element series connected to the chopper-common switching element, characterized in that all switching elements are operated substantially at an equal switching frequency while respective switching elements in each series circuit are alternately turned ON and OFF, a timing of turning ON of the switching element in one of the two series circuits and connected to a low potential side of the smoothing capacitor is substantially equalized to a timing of turning ON of one switching element in the other series circuit and connected to a high potential side of the smoothing capacitor, and an ON duty ratio of at least one of the switching elements substantially equalized in the ON timing is reduced to decrease an output to the load.

Other objects and advantages of the present invention shall be made clear in the following description detailed with reference to embodiments shown in accompanying drawings.

BRIEF DESCRIPTION OF THE DRAWINGS

FIG. 33 is a plan view of a discharge lamp employable in the embodiments of the present invention; and FIG. 34 is a fragmental, explanatory view of the discharge lamp of FIG. 33.

Figure 1:
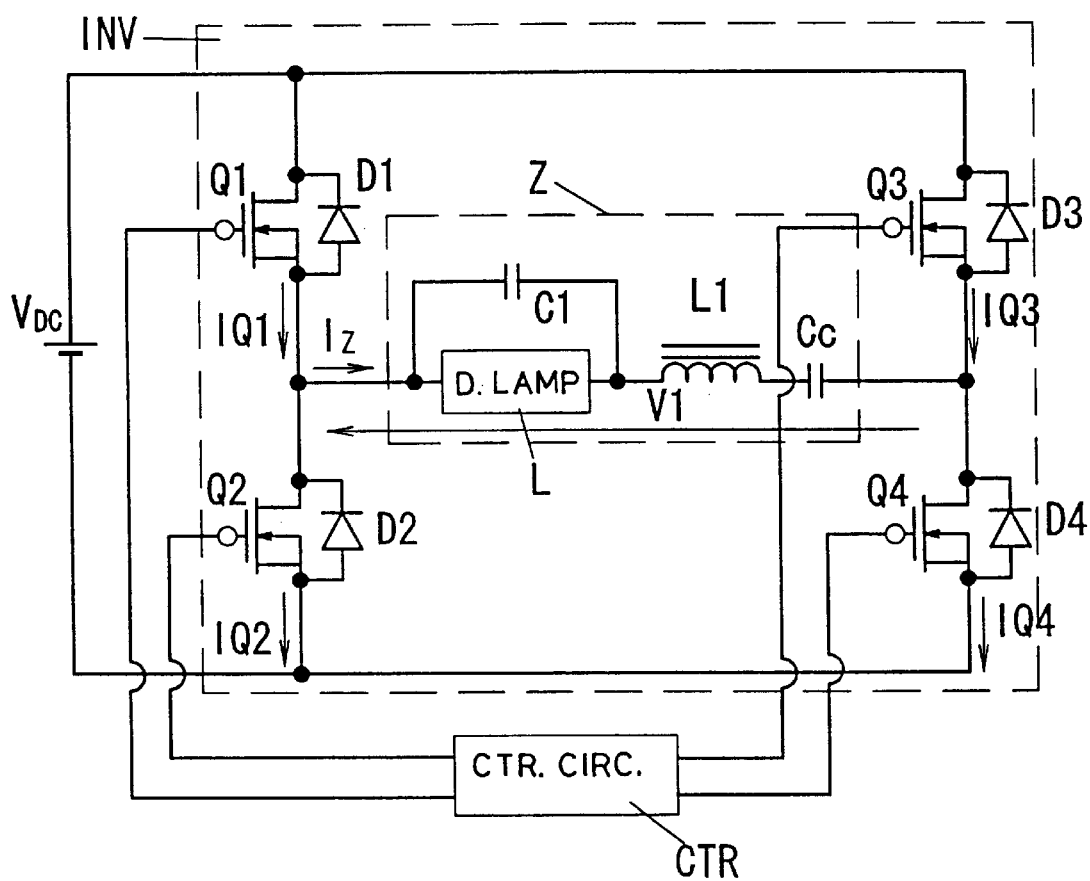
FIG. 1 is a basic circuit diagram of the power source device according to the present invention.

While the description shall now be made with reference to the respective embodiments shown in the drawings, it should be appreciated that the intention is not to limit the present invention only to these embodiments shown but rather to include all alterations, modifications and equivalent arrangements possible within the scope of appended claims.

DETAILED DESCRIPTION OF THE PREFERRED EMBODIMENTS

In FIG. 1, a basic circuit arrangement of the present invention is shown, in which an inverter INV is formed in a so-called full-bridge type inverter, comprising switching elements Q1–Q4 formed with power MOSFET's and respectively having each of parasitic diodes D1–D4 connected inverse parallel to each element, the switching elements being arranged in a first series circuit of a pair of the switching elements Q1 and Q2 and a second series circuit of the other pair of the switching elements Q3 and Q4, and a resonance load circuit Z including an LC resonance circuit of an inductor L1 and capacitor C1, a discharge lamp L and a coupling capacitor Cc, which circuit Z being connected between both junction points of the switching elements Q1 and Q2 in the first series circuit and of the switching elements Q3 and Q4 in the second series circuit.

Figure 2:
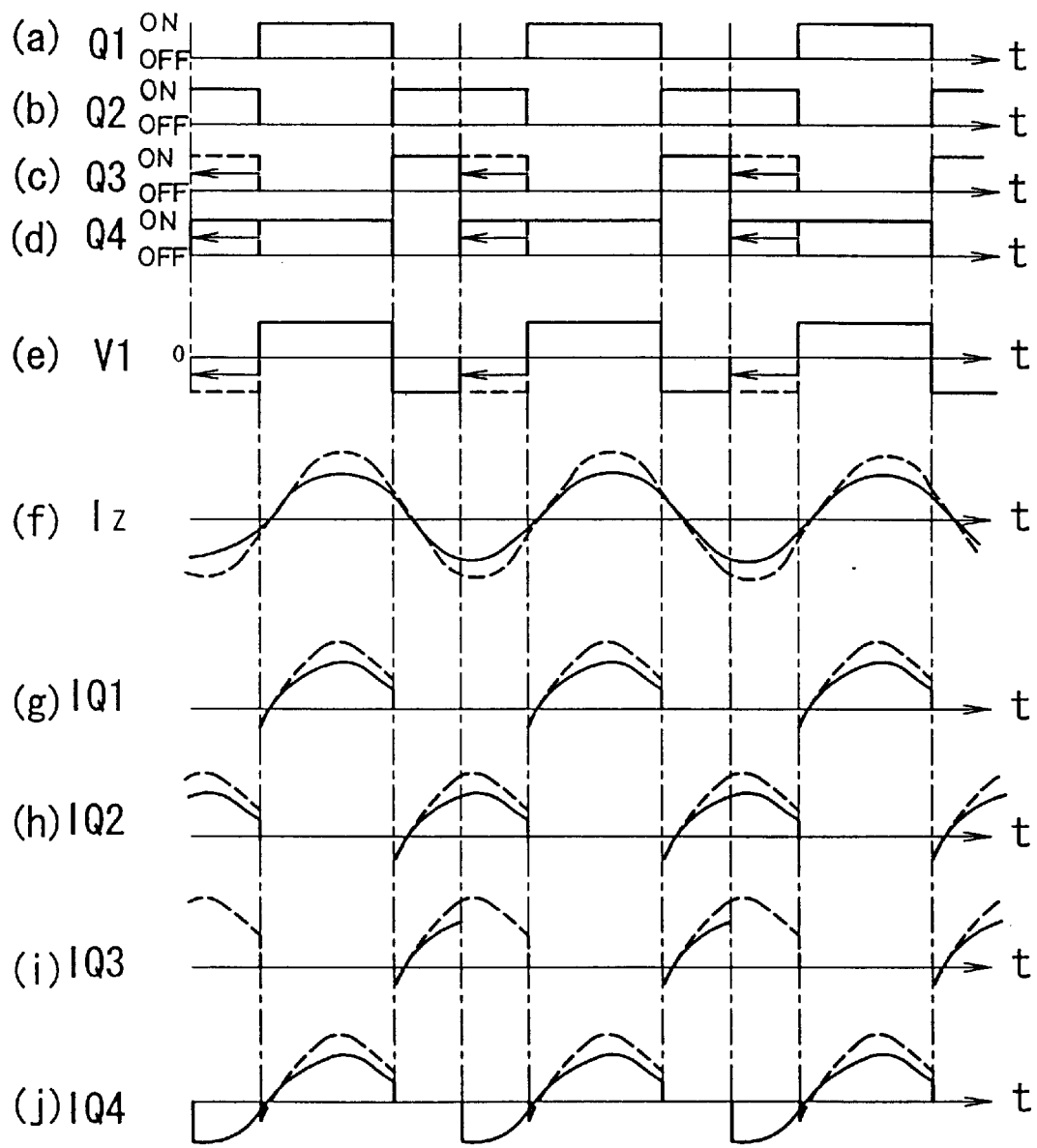
FIG. 2 is a timing chart of waveforms (a) to (j) for explaining the operation of the circuit of FIG. 1.

Referring also to FIG. 2, each pair of the switching elements Q1–Q2 and Q3–Q4 are respectively alternately turned ON and OFF as shown in waveforms (a)–(d). Here, the switching frequency of these switching elements Q1–Q4 is higher than a resonance frequency of the resonance load circuit Z including the LC resonance circuit of the inductor L1 and capacitor C1, the discharge lamp L and the coupling capacitor Cc.

In the present arrangement, the decreasing of the load output is accomplished by substantially equalizing the timing of turning ON of the switching element Q2 and of the switching element Q3 at diagonal position with respect to the element Q2 to each other. In other words, this timing equalization is equivalent to a substantial equalization of the timing of turning OFF of the switching element Q1 to the timing of turning OFF of the diagonally positioned switching element Q4 with respect to the element Q1, so as to render the ON period of the switching element Q4 longer.

When in the inverter INV of the full-bridge arrangement the switching elements Q1 and Q2 as well as the elements Q3 and Q4 are alternately turned ON and OFF and driving signals provided from a control circuit CTR to the switching elements Q1 and Q4 as well as to the switching elements Q2 and Q3 are equalized to render their ON duty ratio to be 50%, then the load can be provided with the maximum output. When, from this state and with the timing of turning ON of the switching elements Q2 and Q3 kept as substantially equalized, the ON duty ratio of the switching element Q3 is varied as shown by an arrow in a waveform (c) of FIG. 2 under the control of the control circuit CTR, the load output shows a tendency of being decreased even when the variation is made large or small.

This is because a rectangular wave voltage V1 applied to the resonance load circuit Z becomes as shown by a waveform (e) of FIG. 2 so as to be small in its fundamental wave ratio, whereby it is made possible to control the load output by varying the ON period of the switching element Q3 but without varying the switching frequency of the switching elements.

Figure 3:
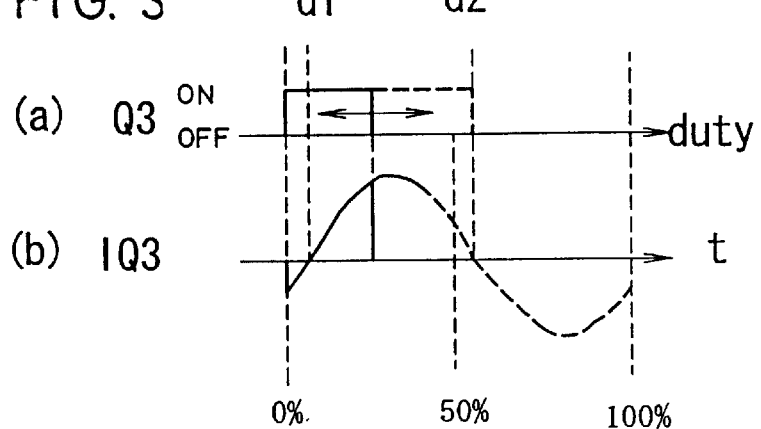
FIG. 3 is a timing chart of further waveforms (a) and (b) for explaining the operation of the circuit of FIG. 1.

In an event where the ON duty ratio of the switching element Q3 is varied while keeping the timing of turning ON of the switching elements Q2 and Q3 as substantially equalized to each other, a current Iz as shown by a waveform (f) in FIG. 2 and flowing to the resonance load circuit Z almost does not vary in the phase. Due to this, when the load output is attempted to be decreased with the duty ratio of the switching element Q3 made larger than d2 as shown in waveform (a) of FIG. 3, a current IQ3 flowing to the switching element Q3 in its OFF state is negative as shown by waveform (b) in FIG. 3 and causes the hard switching operation to occur. When to the contrary the duty ratio of the switching element Q3 is reduced, the hard switching operation does not occur even with the ratio reduced to be below d1, and it is possible to expand the range in which the load output can be controlled without increasing any stress or noise. Waveforms (g)–(i) in FIG. 2 show the currents IQ1–IQ4 flowing to the switching elements Q1–Q4.

Figure 4:
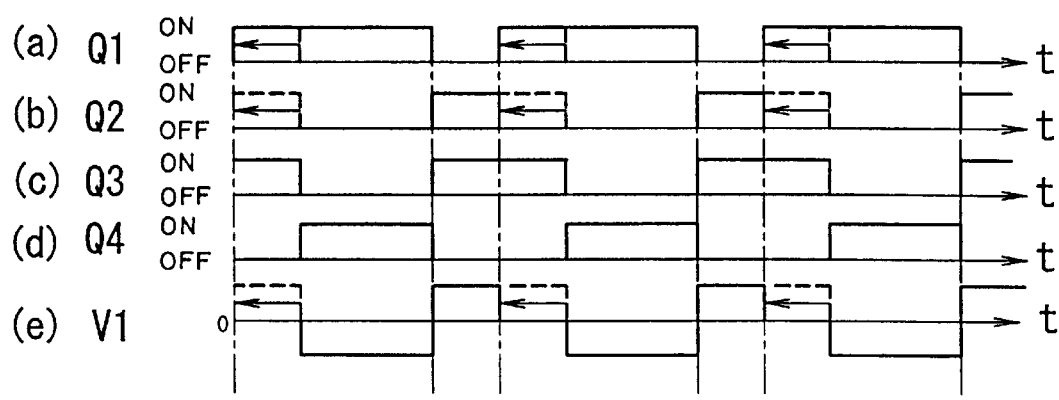
FIGS. 4–7 are timing charts with waveforms (a) to (e) respectively for explaining the operation of respective other embodiments of the present invention.

An embodiment of the device as based on the basic arrangement according to the present invention is constituted as shown by a timing chart of FIG. 4. When the load output is decreased, as shown by waveforms (a)–(d) of FIG. 4, by alternately turning ON and OFF the switching elements Q1 and Q2 as well as the elements Q3 and Q4, the timing of turning ON of the switching element Q2 is substantially equalized to that of the switching element Q3 at the diagonal position to the element Q2, and the ON period of the switching element Q2 is made shorter (the ON duty is made shorter) as shown by an arrow in the waveform (b) of FIG. 4. Accordingly, in the inverter INV of the full-bridge arrangement, the wide load output control can be performed without causing the hard switching operation to occur in respect of all of the switching elements Q1–Q4. Waveform (e) in FIG. 4 shows a voltage V1 applied to the resonance load circuit Z.

Figure 5:
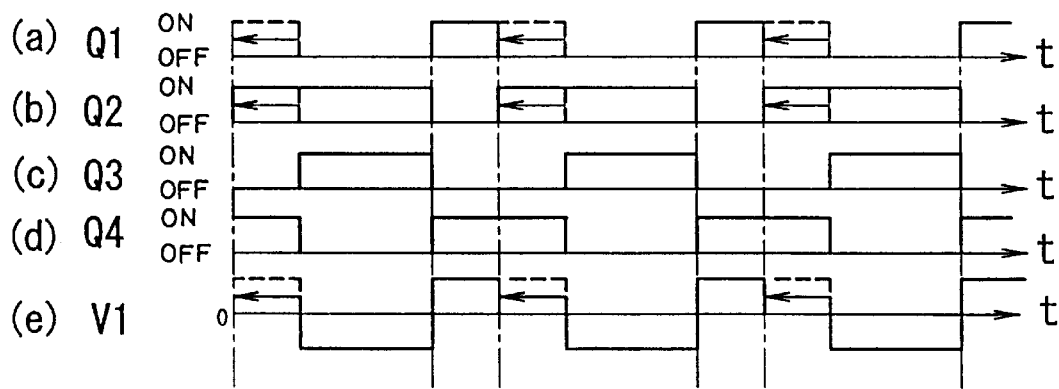

Another embodiment of the present invention is arranged as shown in the time chart of FIG. 5. That is, in decreasing the load output by alternately turning ON and OFF the switching elements Q1 and Q2 as well as the elements Q3 and Q4 as shown by waveforms (a)–(d) in FIG. 5, the timing of turning ON the switching element Q1 and the timing of turning ON the switching element Q4 at the diagonal position to the element Q1 are substantially equalized, so as to shorten the ON period (to reduce the ON duty) of the switching element Q1 as shown by an arrow in waveform (a) of FIG. 5.

In this embodiment, too, the inverter INV of the full-bridge arrangement allows the wide range load output control to be realized without involving all of the switching elements Q1–Q4 in the hard switching operation. Waveform (e) of FIG. 5 shows the rectangular wave voltage V1 applied to the resonance load circuit Z.

Figure 6:
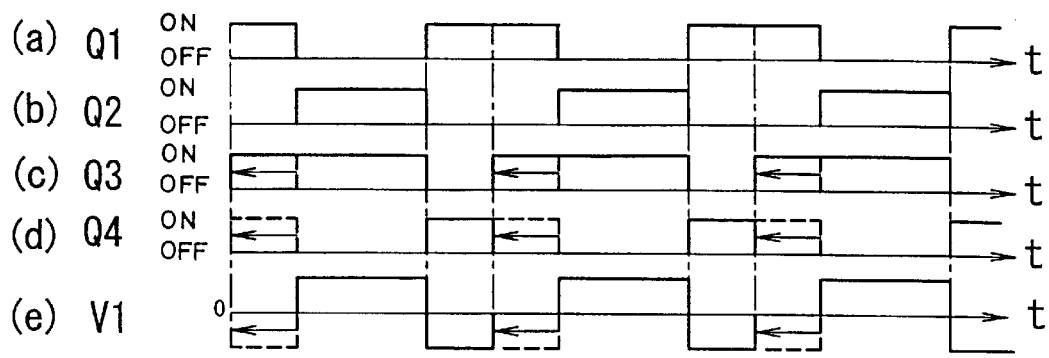

In another embodiment of the present invention as shown by a timing chart of FIG. 6, the decreasing of the load output with the switching elements Q1 and Q2 as well as the elements Q3 and Q4 alternately turned ON and OFF is attained by substantially equalizing the timing of turning ON of the switching element Q1 to that of the switching element Q4 at the diagonal position with respect to the element Q1. In the present embodiment, as shown by waveform (d) of FIG. 6, the load output decreasing is realized by shortening the ON period of the switching element Q4 (reducing the ON duty).

The inverter INV of the full bridge arrangement in the present embodiment also allows the wide range control of the load output to be performed without involving any switching element in the hard switching operation. Waveform (e) in FIG. 6 shows the rectangular wave voltage V1 applied to the resonance load circuit Z.

Figure 7:
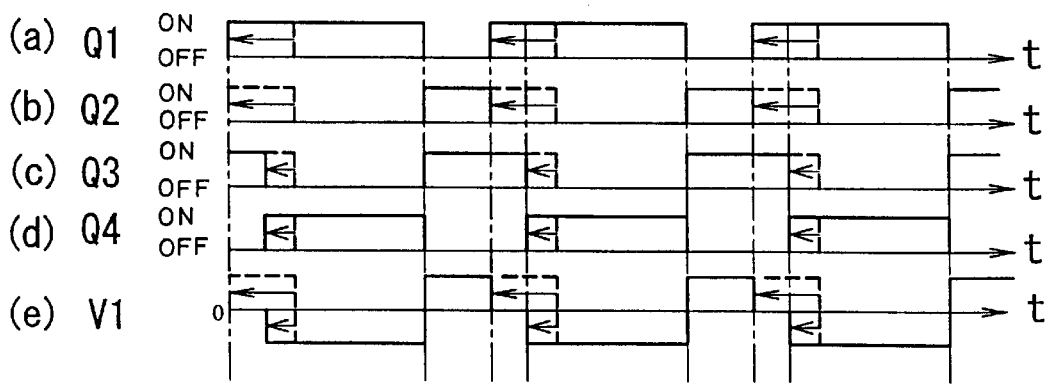

In another embodiment of the present invention as shown by a time chart of FIG. 7, the switching elements Q1 and Q2 as well as the elements Q3 and Q4 are alternately turned ON and OFF as shown by waveforms (a)–(d) in FIG. 7 and, in decreasing the load output, the timing of turning ON of the switching element Q2 and that of the switching element Q3 at the diagonal position with respect to the element Q2 are substantially equalized. In the present embodiment, the decreasing of the load output is realized by shortening the ON period (reducing the ON duty) of the switching elements Q2 and Q3 as shown by arrows in the waveforms (b) and (c) In this case, the shortened ON period of these switching elements Q2 and Q3 causes the rectangular wave voltage V1 applied to the resonance load circuit Z to be further reduced in the fundamental wave ratio as shown in waveform (e) of FIG. 7, and it is possible to further decrease the load output.

It is also possible to execute the wide range control of the load output in this inverter INV of the full bridge arrangement of the present embodiment without occurrence of the hard switching operation at any of the switching elements Q1–Q4, and the controllable range for the load output in particular can be further expanded.

Figure 8:
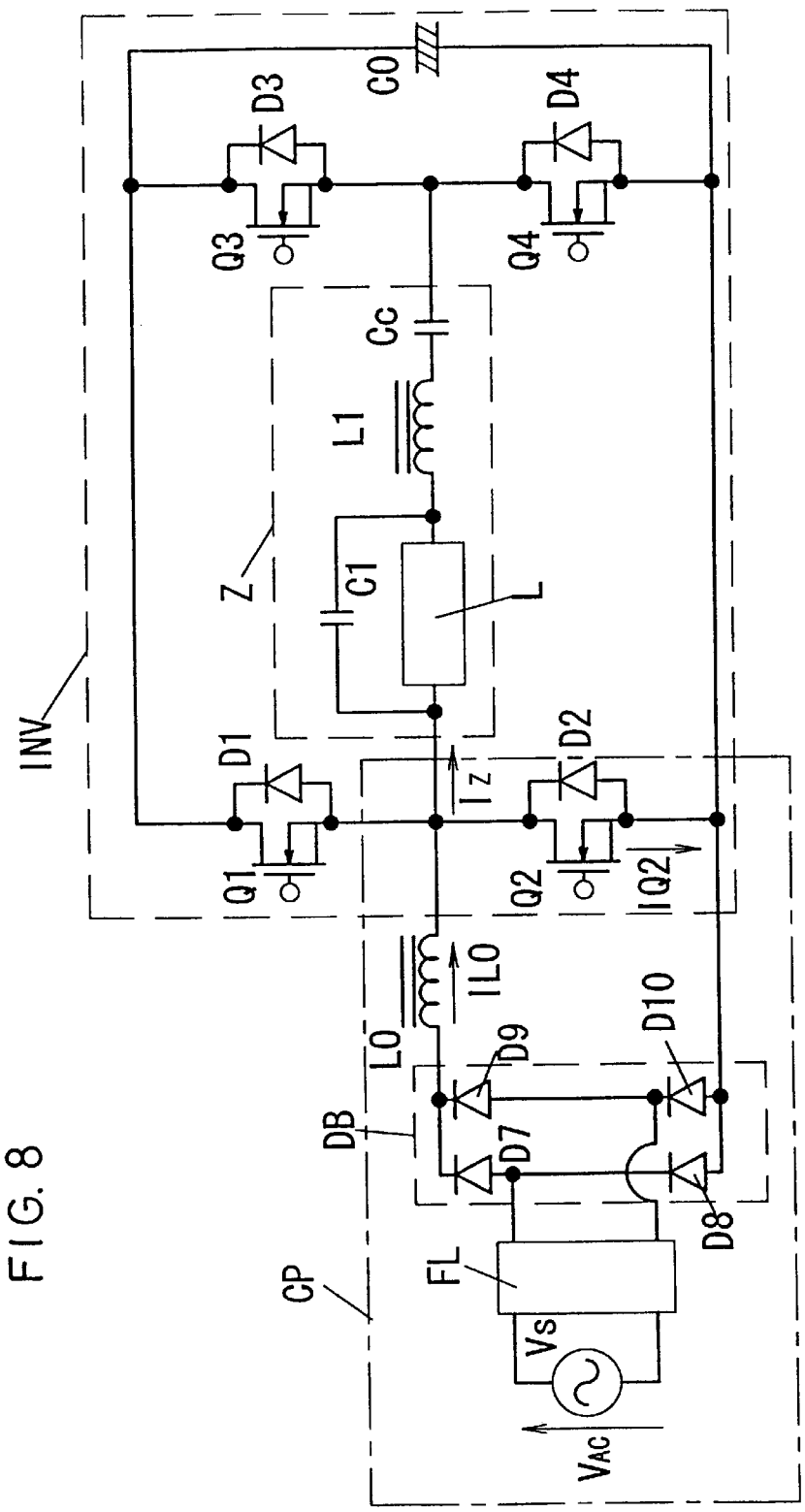
FIG. 8 is a circuit diagram of the device in another embodiment of the present invention.

In another embodiment of the present invention as shown in FIG. 8, one (the switching element Q2 in FIG. 8) of the switching elements Q1–Q4 in the bridge connection in the inverter INV is made to commonly act as a switching element of a chopper CP, and a high frequency power is supplied to the resonance load circuit Z with the inverter INV of the full bridge circuit, while restraining the higher harmonic distortion of input current by means of the chopper CP.

In decreasing the load output in the present embodiment, the timing of turning ON of the switching element Q2 in the inverter INV and acting commonly as the switching element of the chopper CP and the timing of turning ON of the switching element Q3 at the diagonal position to the element Q2 are equalized substantially, so as to shorten the ON period of the element Q3. While an identical full bridge arrangement to the circuit arrangement of the inverter INV is employed, both output terminals of a diode bridge DB comprising diodes D7–D10 are connected through an inductor LO across the drain and source of the switching element Q2 in the chopper CP, and a commercial power source Vs is connected through an AC filter FL across input terminals of the diode bridge DB. Further, the arrangement of the inverter INV is shown with a control circuit omitted. As the operation of the chopper CP has been well known, further, its description is omitted here. Further, while a smoothing capacitor CO is shown in the drawing as enclosed in a broken-line frame for the inverter INV, the capacitor is to be included in the chopper CP.

Figure 9:
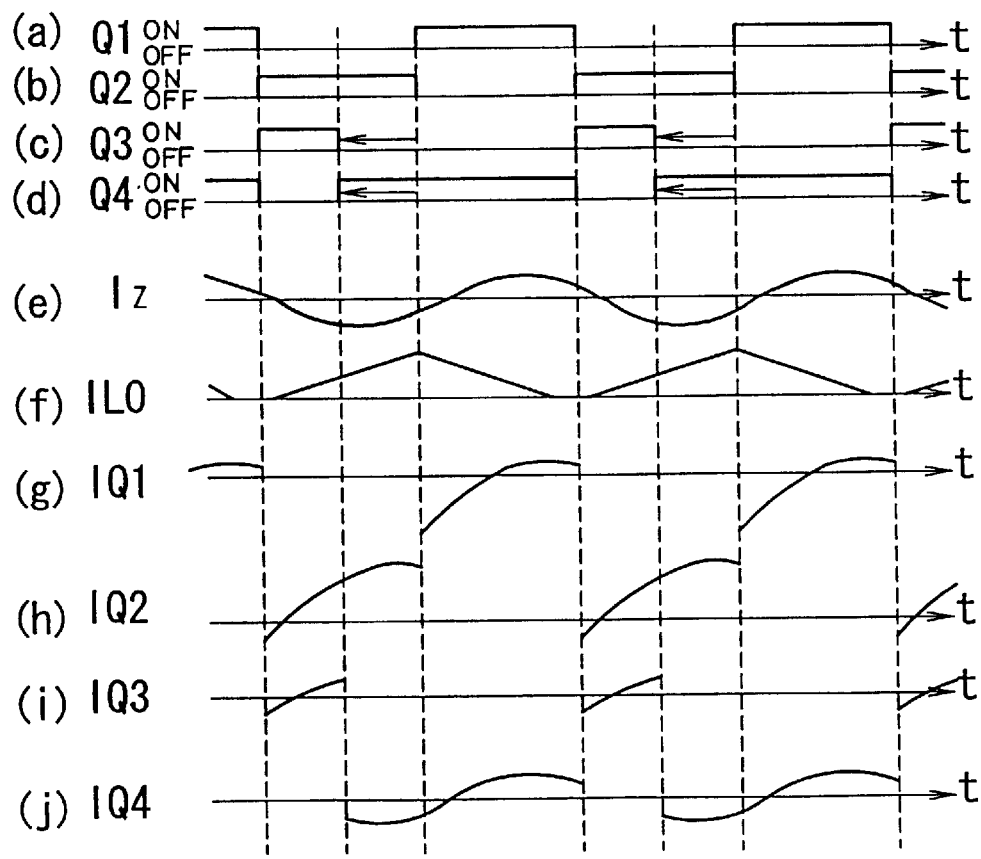
FIG. 9 is a timing chart with waveforms (a) to (j) for explaining the operation in the embodiment of FIG. 8.

As the switching elements Q1–Q4 turn ON and OFF at such timing as shown in waveforms (a)–(d) of FIG. 9 under the control of the control circuit (not shown), there flow a load current Iz of a lagging resonance current and a chopper current ILO as shown in waveforms (e) and (f) of FIG. 9. Referring to the current flowing to the respective switching elements Q1–Q4, a composite current IQ2 of the lagging load current Iz and the chopper current ILO flowing to the inductor LO flows to the switching element Q2 acting commonly for the chopper CP upon turning ON of this element, as shown by waveform (h) in FIG. 9. Similarly, there flow to the switching element Q1 the load current Iz and a negative current of the chopper current ILO as shown by waveform (g) in FIG. 9. To the switching elements Q3 and Q4, further, only the load current Iz flows as shown by waveforms (i) and (j) of FIG. 9.

In the present embodiment, the input power is controlled by means of the ON duty ratio of the switching element Q2 controlled by the control circuit (not shown) When the ON duty ratio of the switching element Q2 is increased, the power drawn from the commercial power source Vs is enlarged, whereas the reduction of the ON duty ratio of the element Q2 causes the power drawn from the source Vs is made smaller. At this time, the switching element Q1 turns ON and OFF complementarily with respect to the element Q2.

For the load output control, the turning-ON timing of the switching element Q2 and the turning-ON timing of the switching element Q3 diagonally positioned to the element Q2 are equalized, and the ON duty ratio of the switching element Q3 is controlled towards a reduction from 50%. Upon which the switching element Q4 turns ON and OFF complementarily to the element Q3. The output is the maximum when the ON duty ratio of the switching element Q3 is substantially 50%, and the output is controlled by gradually reducing the ON duty ratio of the switching element Q3 from the level of the maximum output as shown by arrows in waveform (c) of FIG. 9.

With the turning-ON timing of the switching elements Q2 and Q3 equalized, the output control can be performed without causing the hard switching to occur at the switching element Q3. With the ON duty ratio of the switching element Q2 reduced, on the other hand, it is possible to control the input power.

That is, in the present embodiment, the input power control is performed by means of the ON duty ratio of the switching element Q2, and the output control is performed by means of the ON duty ratio of the switching element Q3. As has been referred to, the present embodiment is capable of restricting the higher harmonic distortion of the input with the simple main circuit arrangement and, at the same time, attaining the wide range output control by controlling independently the input and output powers.

Figure 10:
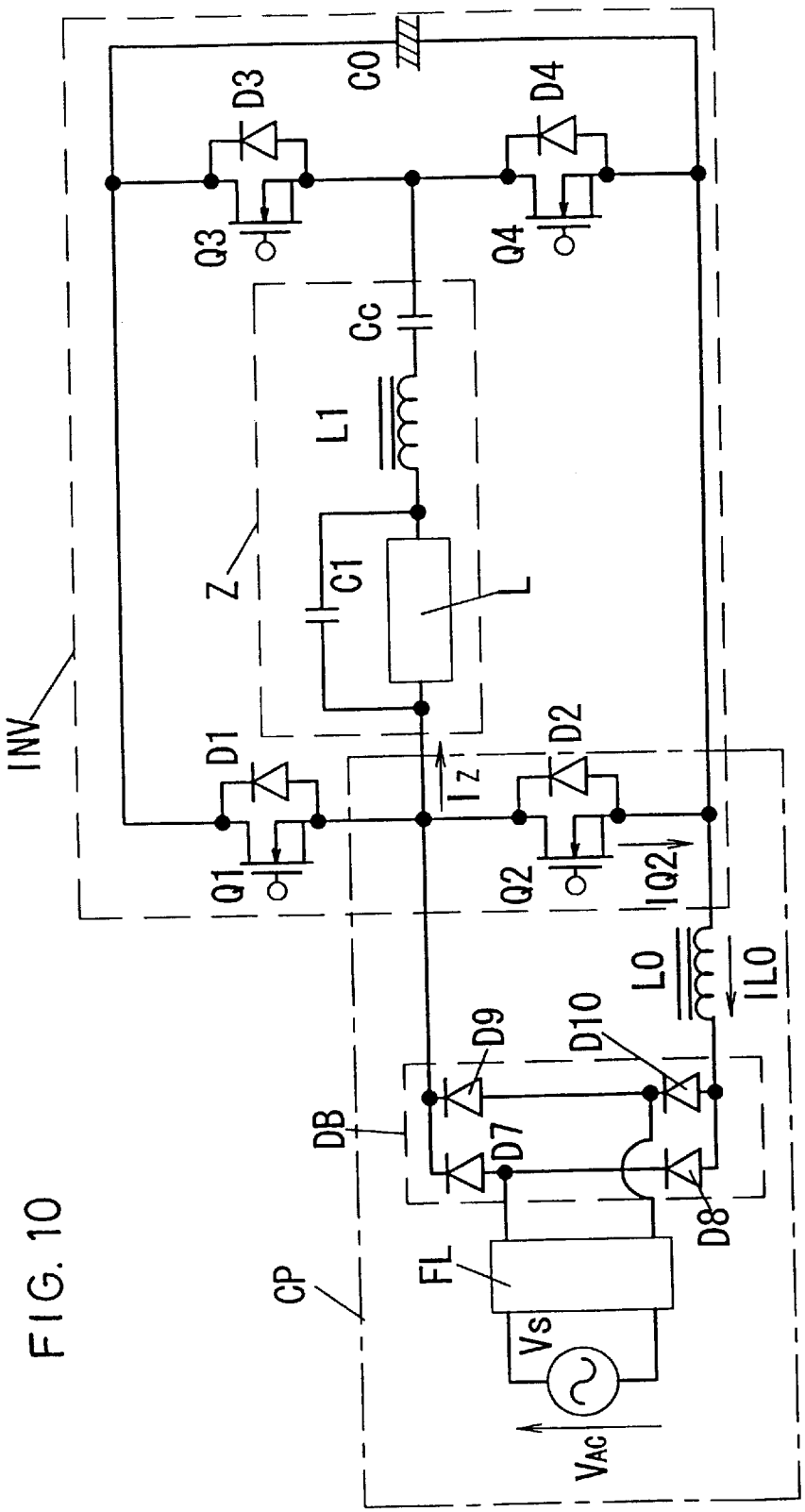
FIGS. 10–12 are circuit diagrams of the device in other embodiments of the present invention.

In another embodiment of the present invention as shown in FIG. 10, the circuit is arranged by inserting the inductor LO between an negative output terminal of the diode bridge DB and the source of the switching element Q2, and the same effect can be attained through the same control.

Figure 11:
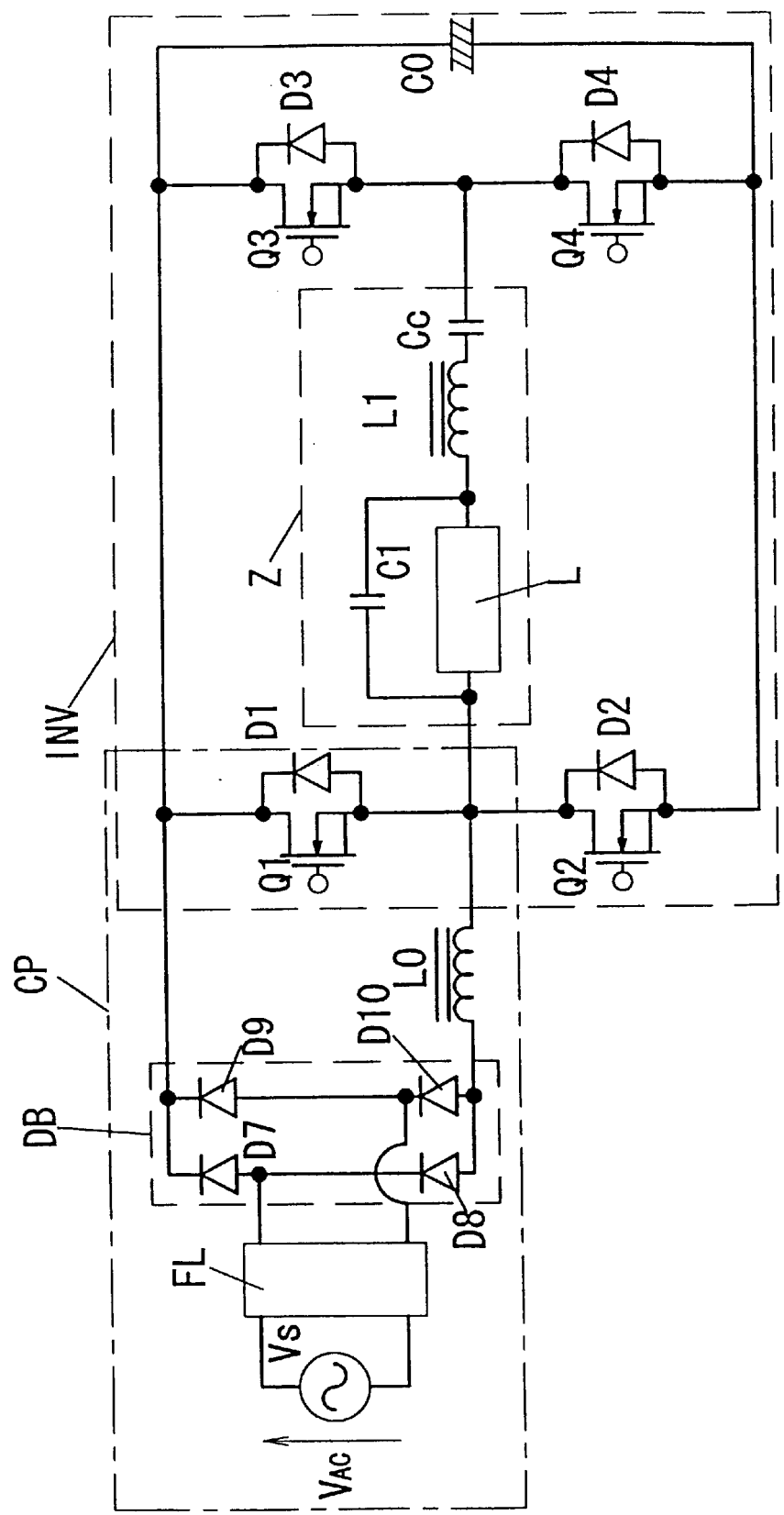

In another embodiment of the present invention as shown in FIG. 11, the switching element Q1 in the inverter INV is employed commonly as the switching element of the chopper CP, in which both output terminals of the diode bridge DB connected at the input terminals through the AC filter FL to the commercial power source Vs are connected through the inductor LO across the drain and source of the switching element Q1. The same control circuit as that in the foregoing embodiments for the switching elements Q1–Q4 is employed but is omitted from FIG. 11.

In the present embodiment, the turning-ON timing of the switching elements Q1 and Q4 mutually at the diagonal position are substantially equalized as controlled by the control circuit (not shown) to shorten the ON period of the switching element Q4, and the load output can be thereby controlled.

Further, with the reduction in the ON duty ratio of the switching element Q1 employed commonly as the switching element of the chopper CP, the input power can be controlled. In the chopper CP, by the way, the diode bridge DB is connected at negative side of the output terminals through the inductor LO to a junction point between the switching elements Q1 and Q2 and at the positive side output terminal to the drain of the switching element Q1.

Figure 12:
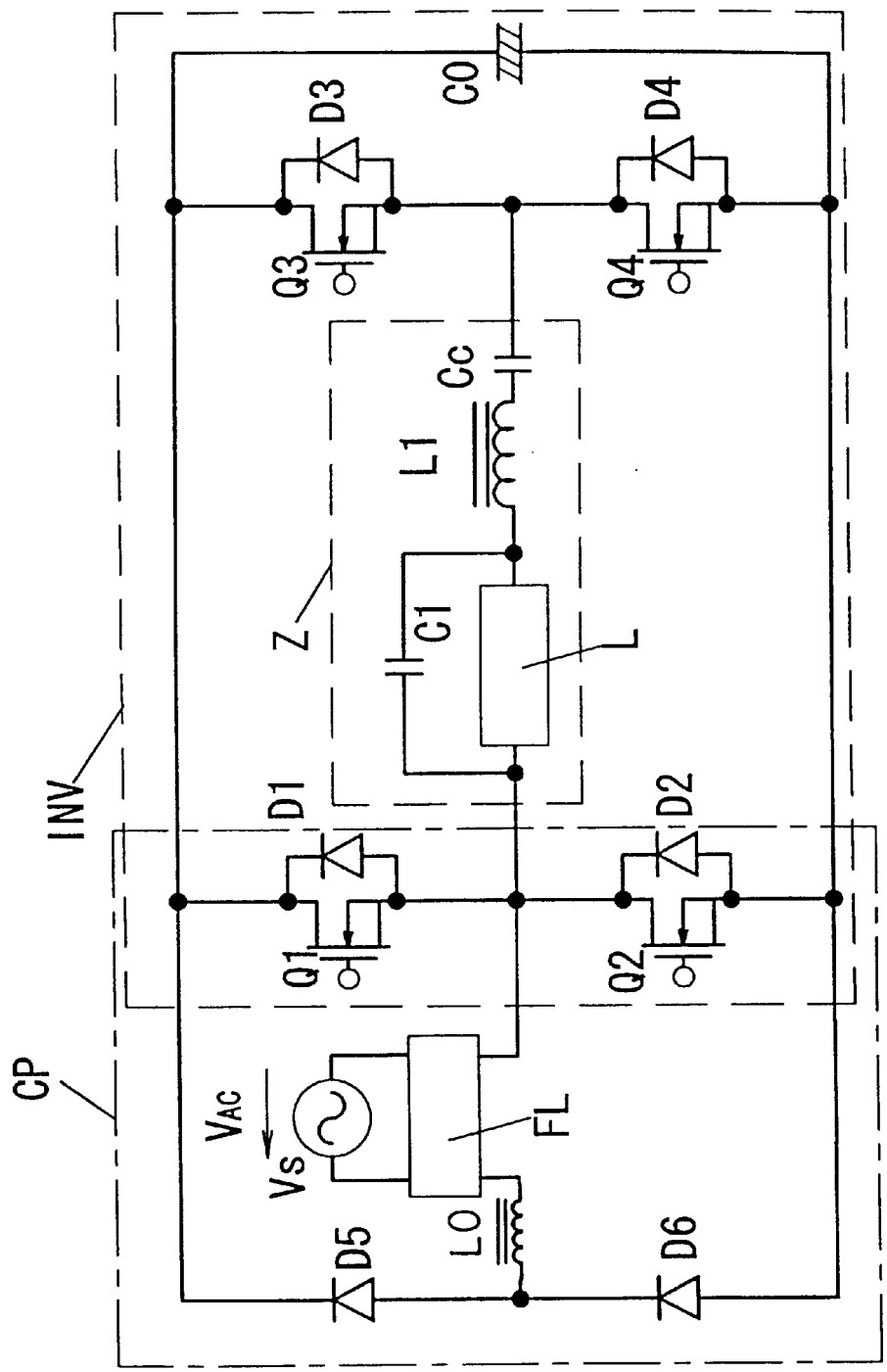

In another embodiment of the present invention as shown in FIG. 12, the inverter INV of the full bridge arrangement is employed, two switching elements Q1 and Q2 in which inverter INV are employed commonly as the switching elements of the chopper CP, the parasitic diodes D1 and D2 of the switching elements Q1 and Q2 and further diodes D5 and D6 are forming the diode bridge of the chopper CP, and a high frequency power is supplied to the resonance load circuit Z by means of the inverter INV while restraining the higher harmonic distortion of the input current by means of the chopper CP. In this chopper CP, the AC filter FL is connected on input side across the commercial power source Vs, at one of output terminals to the junctions point between the switching elements Q1 and Q2 and at the other output terminal through the inductor LO to a junction point between the diodes D5 and D6. The inverter INV is arranged identical to that in the foregoing embodiments, and the control circuit is omitted from the drawing.

Now, in the present embodiment, the switching element Q1 is operated as the common switching element of the chopper CP at the time when the voltage VAC of the commercial power source Vs is positive (when a voltage on the side of the junction point. of the diodes D5 and D6 becomes higher than that on the side of the junction of the switching elements Q1 and Q2). That is, the input power is controlled by reducing the ON duty ratio of the switching element Q1 with the control of the control circuit (not shown), while the load output is controlled by substantially equalizing the turning-ON timing of the switching elements Q1 and Q4 mutually at the diagonal position so as to shorten the ON period of the switching element Q4.

When, on the other hand, the voltage VAC of the source Vs is negative (when the voltage on the side of the junction point of the switching elements Q1 and Q2 is higher than that on the side of the junction point of the diodes D5 and D6), the other switching element Q2 is operated as the common switching element of the chopper CP, to have the control performed. That is, the input power is controlled by decreasing the ON duty ratio of the switching element Q2, and the load output is controlled by substantially equalizing the turning-ON timing of the switching elements Q2 and Q3 mutually at the diagonal position so as to shorten the ON period of the switching element Q3.

In the chopper CP of FIG. 12, further, the same effect can be attained even when the inductor LO is inserted between the one output end of the AC filter FL and the junction point of the switching elements Q1 and Q2 while the other output end of the filter is connected directly to the junction point of the diodes D5 and D6.

With the present embodiment, as has been described, it is possible to restrain the harmonic distortion of the input power and, at the same time to independently control the input and output powers, so as to allow the wide range output control to be performed.

Figure 13:
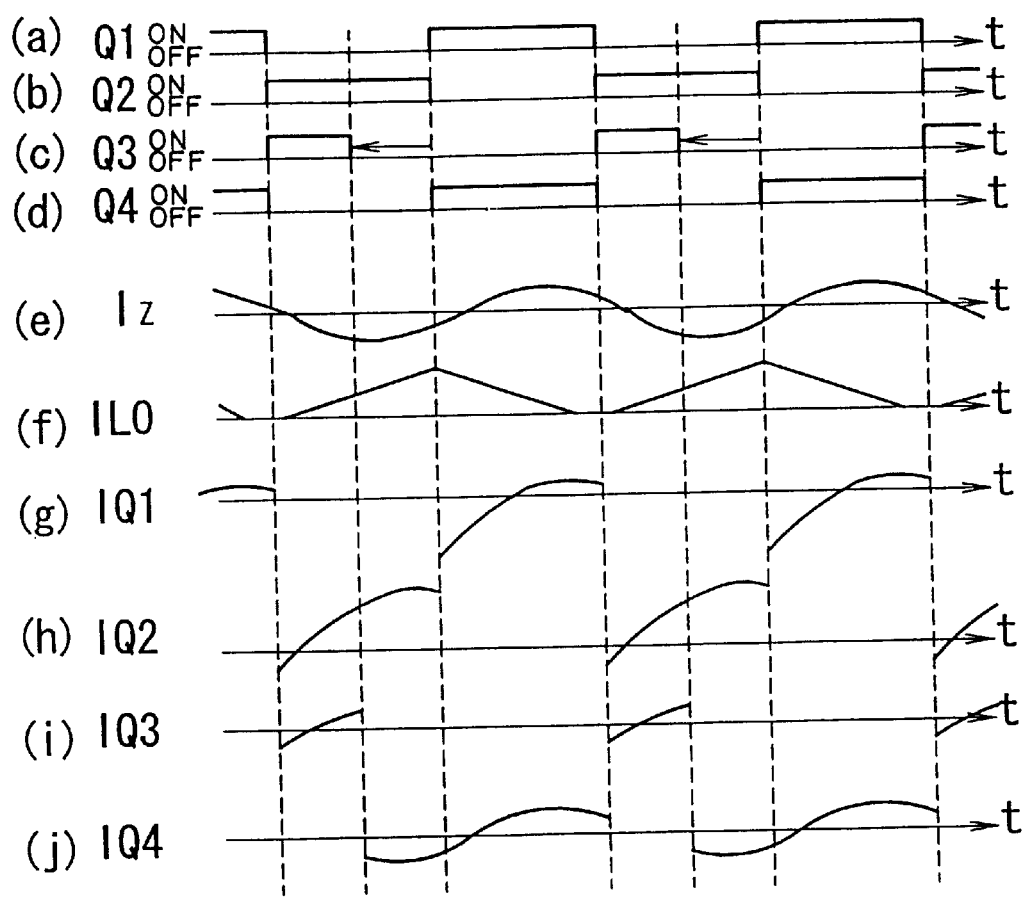
FIGS. 13 and 14 are timing charts with waveforms (a) to (j) respectively for explaining the operation of other embodiments of the present invention.

Another embodiment of the present invention is constituted as shown by a timing chart of FIG. 13.

In the present embodiment, one of the switching elements in the inverter INV in the full bridge arrangement of the elements is employed as the common switching element of the chopper CP, and a high frequency power is supplied by the full bridge inverter INV to the resonance load circuit Z, while restraining the harmonic distortion of the input current by means of the chopper CP.

In decreasing the load output with the present embodiment, the turning-ON timing of the switching element Q2 operated as the common element to the chopper CP is substantially equalized to the turning-ON timing of the switching element Q3 at the position diagonal to the element Q2, and the ON period of only the switching element Q3 can be shortened.

When the switching elements Q1–Q4 operate to turn ON and OFF at the timing shown in waveforms (a)–(d) of FIG. 13, there flow such lagging load current Iz and chopper current ILO as shown in waveforms (e) and (f). Referring to the current flowing to each of the switching elements Q1–Q4, a composite current IQ2 of the lagging load current Iz and the chopper current ILO to the inductor LO such as shown in waveform (h) of FIG. 13 is made to the switching element Q2 in its ON period and acting as the element common to the chopper CP, and similarly such composite current IQ1 of the load current Iz and the chopper current ILO as shown in waveform (g) of FIG. 13 flows to the switching element Q1. To the switching elements Q3 and Q4, only the load current Iz is made to flow as shown by waveforms (i) and (j) of FIG. 13 in the form of the currents IQ3 and IQ4.

In the present embodiment, the load output control is performed by equalizing the turning-ON timing of the switching element Q3 at the diagonal position to the switching element Q2 to the timing of the element Q2, and controlling the ON duty ratio of the switching element Q3 towards the decrement from 50% as shown by arrows in waveform (c) of FIG. 13. At this time, there is no specific conditions for restricting the switching element Q4. The output is the maximum when the ON duty ratio of the switching element Q3 is about 50%, and the output is adjusted by gradually decreasing the ON duty ratio of the element Q3 from the level of the maximum output.

With the equalization of the turning-ON timing of the switching element Q3 to that timing of the element Q2, it is possible to control the output without causing the hard switching to occur at the switching element Q3. That is, the output control is performed by varying only the ON duty ratio of the switching element Q3.

With the present embodiment of the arrangement as has been described,. the harmonic distortion of the input power can be restricted similarly to any known device but in the simpler main circuit arrangement while allowing at the same time the output control to be performed.

While in the embodiment of FIG. 13 the switching element Q2 of the inverter INV is operated to act as the element common to the chopper CP, it is also possible to employ the switching element Q1 of the inverter INV as the common element to the chopper CP.

That is, in this case, the load output is regulated by substantially equalizing the turning-ON timing of the switching element Q1 and the switching element Q4 at the diagonal position to the element Q1, so as to shorten the ON period of the switching element Q4.

In another embodiment of the present invention, the inverter INV of a 2-element common use type full bridge arrangement in which two of the full-bridge switching elements are employed as the elements common to the chopper CP is used. Accordingly, in the present embodiment, the switching element Q1 is actuated to be the one common to the chopper CP when the voltage VAC of the commercial power source Vs is positive. That is, the load output regulation is performed such that the switching elements Q1 and Q4 mutually at the diagonal position are substantially equalized in the turning-ON timing, so as to shorten the ON period of the switching element Q4.

When the voltage VAC of the source Vs is negative, on the other hand, the switching element Q2 is operated as the element common to the chopper CP, to perform the control. That is, the turning-ON timing of the switching element Q2 and such timing of the switching element Q3 positioned diagonal to the element Q2 are substantially equalized to shorten the ON period of the switching element Q3, so as to perform the load output regulation.

Figure 14:
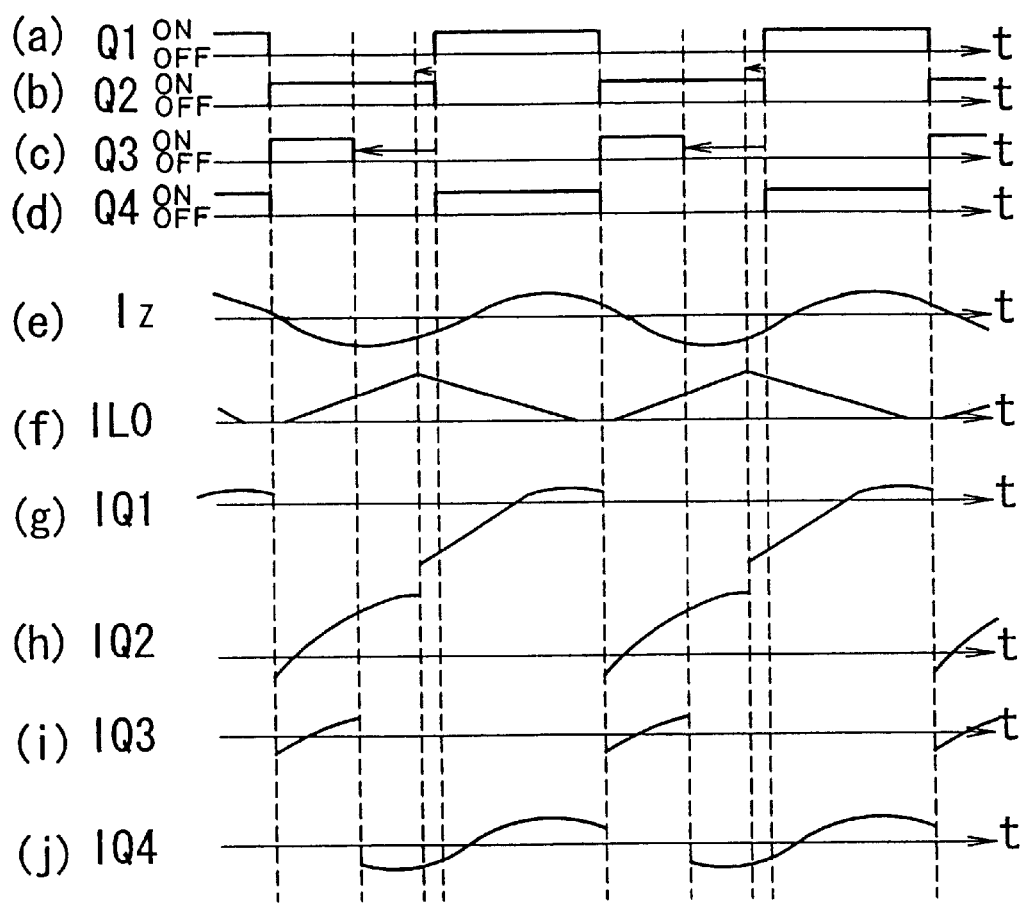

In another embodiment according to the present invention and arranged to operate as shown by a timing chart of FIG. 14, the switching elements Q1–Q4 are turned ON and OFF at the timing as shown in waveforms (a)–(d) of FIG. 14, and there flow such lagging load current Iz and chopper current ILO as shown by waveforms (e) and (f) of FIG. 14. Referring to the current flowing to the respective switching elements Q1–Q4, the composite current IQ2 of the lagging load current Iz and the chopper current ILO flowing to the inductor LO flows to the switching element Q2 acting in common to the chopper CP in ON state of the element Q2. Similarly, the load current Iz and the chopper current ILO are caused to flow to the switching element Q1 as such current IQ1 as shown by waveform (g) of FIG. 14. To the switching elements Q3 and Q4, there flows only such load current Iz as currents IQ3 and IQ4, as shown by waveforms (i) and (j) of FIG. 14.

Now, in the present embodiment, the input power is controlled by means of the ON duty ratio of the switching element Q2. The power drawn from the commercial power source Vs is increased when the ON duty ratio of the switching element Q2 is increased whereas the power drawn from the source Vs is decreased when the ON duty ratio of the element Q2 is decreased. At this time, the switching element Q1 turns ON and OFF without relying on the switching element Q2. The load output control is carried out by equalizing the turning ON timing of the switching element Q3 at the position diagonal to the switching element Q2, and controlling the ON duty ratio of the switching element Q3 from 50%. At this time, the switching element Q4 turns ON and OFF without relying on the switching element Q3. The maximum output is attained when the ON duty ratio of the switching element Q3 is about 50%, and the output is regulated by decreasing the ON duty ratio of the switching element Q3 from the level of the maximum output. Accordingly, the output control can be performed without causing the switching element Q3 to operate the hard switching, by means of the equalization of the turning ON timing of the switching elements Q2 and Q3. On the other hand, it becomes possible to control the input power by decreasing the ON duty ratio of the switching element Q2.

That is, in the present embodiment, the input power control is performed by means of the ON duty ratio of the switching element Q2, while the output control is carried out by means of the ON duty ratio of the switching element Q3. As has been disclosed, the present embodiment is capable of restraining the harmonic distortion of input and, at the same time, allowing the wide range output control to be possible with the independent control of the input and output powers.

Figure 15:
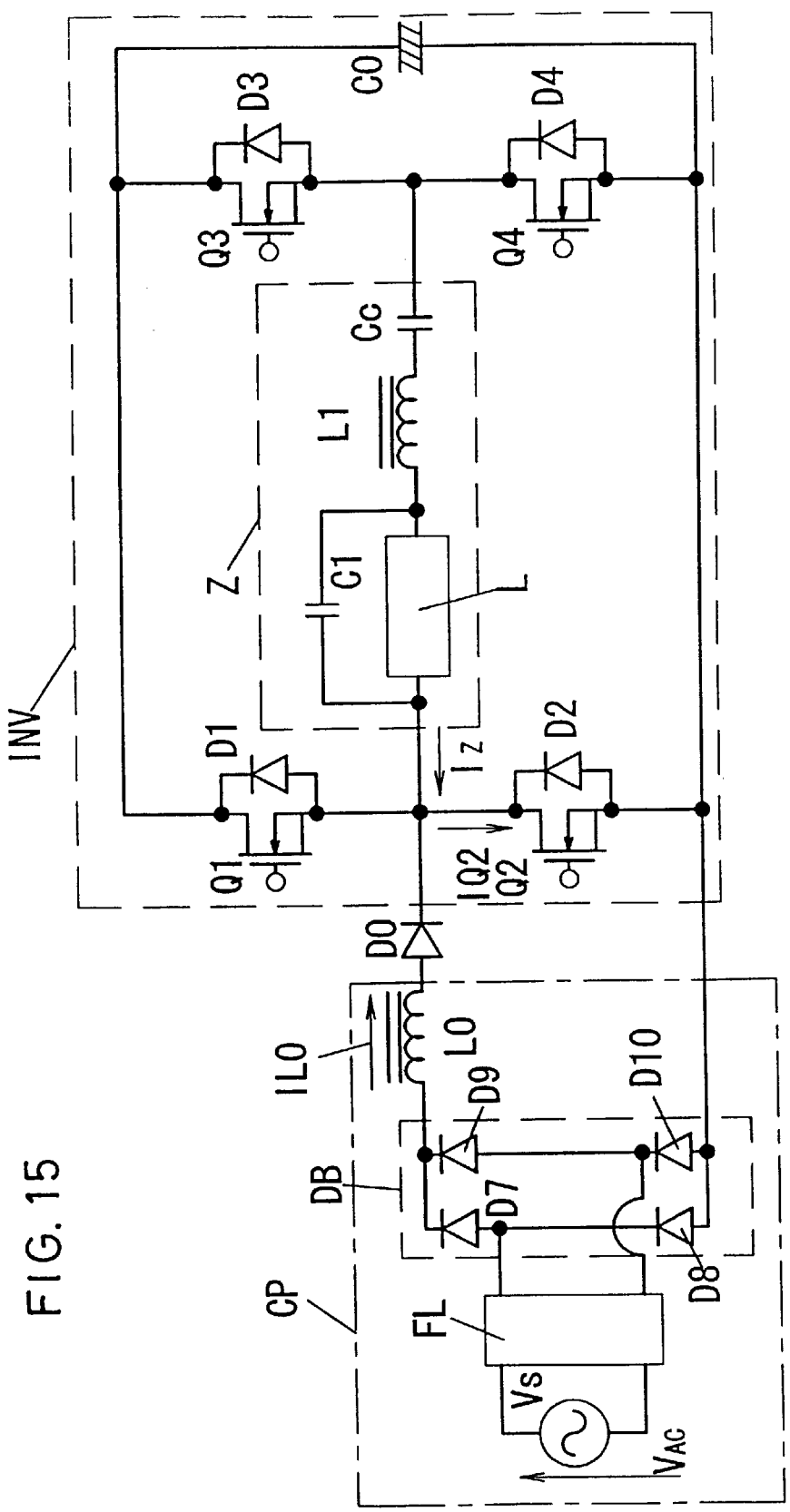
FIG. 15 is a circuit diagram of the device in another embodiment according to the present invention.

In another embodiment of the present invention shown in FIG. 15, a diode DO is inserted between the inductor LO and the junction point of the switching elements Q1 and Q2, and the switching element Q2 in the inverter INV of the full bridge arrangement is employed commonly as the switching element of the chopper CP. In FIG. 15, identical circuit components to those in the foregoing embodiments are denoted by the identical codes.

Figure 16:
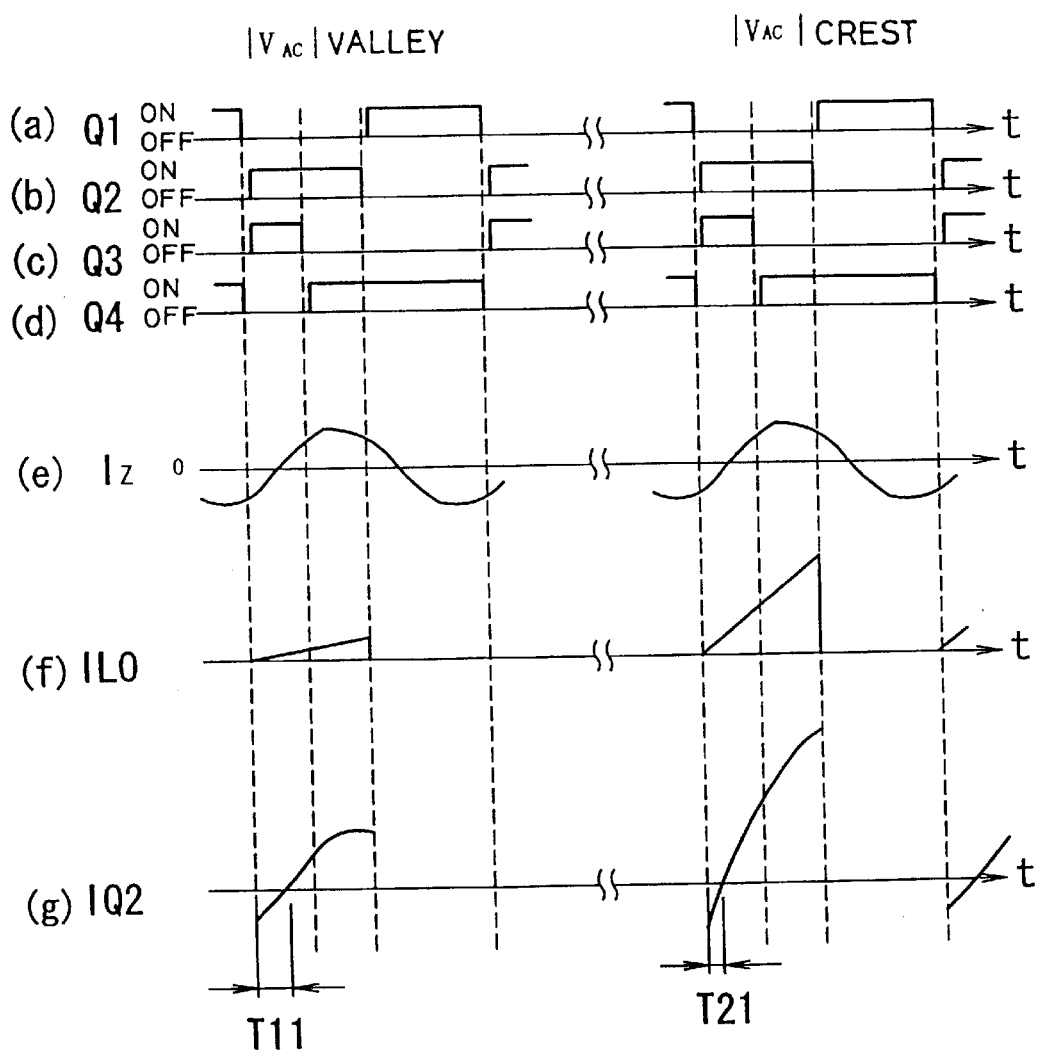
FIGS. 16 and 17 are timing charts with waveforms (a) to (g) respectively for explaining the operation of the embodiment of FIG. 15.

The current IQ2 flowing to the switching element Q2 at crests and valleys of the absolute value of the source voltage |VAC| when the switching elements Q1–Q4 are driven with their switching frequency or ON duty made constant as shown in waveforms (a)–(d) of FIG. 16 will be of such waveform as shown by waveform (g) of FIG. 16. This current IQ2 is a composite current of the chopper current ILO and such lagging load current Iz flowing to the resonance load circuit Z as shown by waveform (e) of FIG. 16. The chopper current ILO shown by waveform (f) in FIG. 16 is proportional to |VAC| and will be large at the crests of |VAC| but will be small at its valleys. Therefore, negative period of the current IQ2 will be longer at the valleys of |VAC| and shorter at its crests.

While in this case the switching elements Q1 and Q2 as well as the switching elements Q3 and Q4 are alternately turned ON, they are provided with such dead-off period as shown by waveforms (a)–(d) in FIG. 16 in order to prevent them from turning simultaneously ON. Accordingly, it is required to render periods T11 and T21 to be longer than the dead off period, for causing the switching element Q2 to turn ON with zero current.

When the load current Iz becomes small with the load output reduced, the period T11 at the valleys of |VAC| as well as the period T21 thereof become shorter, so that the period T21 will be shorter than the period T11. Accordingly, a lower limit of the dimming down to which the switching element Q2 can turn OFF is determined by the period T21 at the crests of |VAC|, notwithstanding the presence of allowance for decreasing the load output since the period T11 is longer than the dead off period at the valleys of |VAC|.

Figure 17:
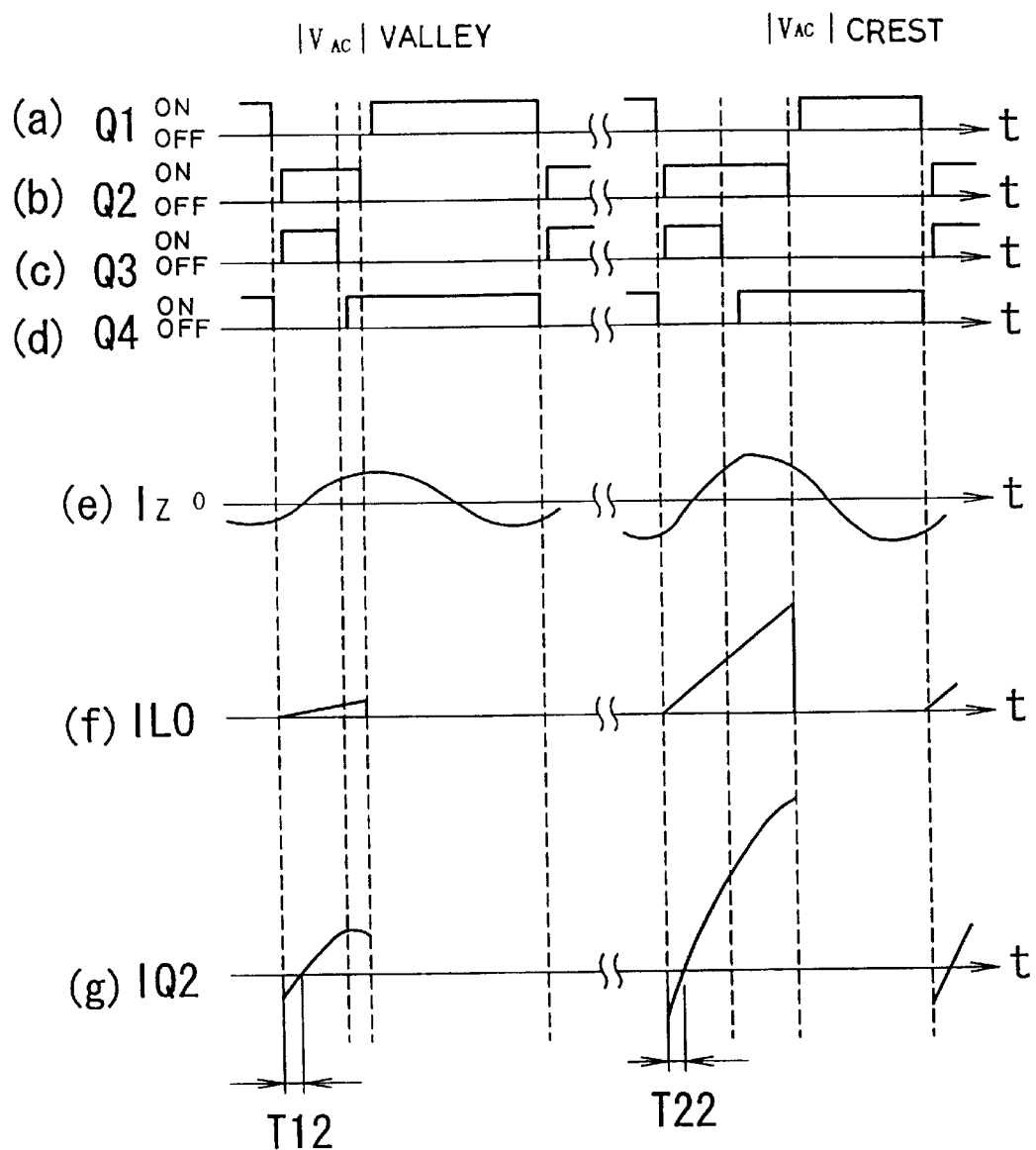

In order to further decrease the load output, the ON period of the switching element Q2 is made shorter at the valley of |VAC| than that at the crest as in waveform (b) of FIG. 17 to reduce the load current Iz as in waveform (e) of FIG. 17, and the load output at the valley of |VAC| is further decreased than that at the crest of |VAC|.

Comparing the negative periods (T12 and T22) of the current IQ2 shown by waveform (g) of FIG. 17 with the periods (T11 and T21) of FIG. 16, they are equal in the ON duty at the crest of |VAC| so that T21=T22 is attained and the zero current turning ON is performed similarly to the case of FIG. 16.

Figure 18:
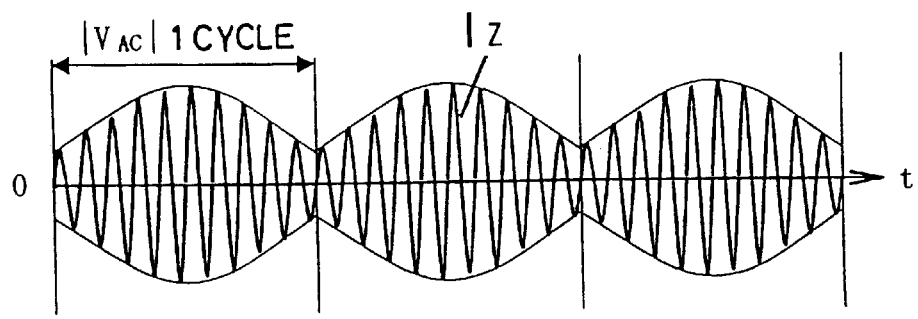
FIG. 18 is a waveform diagram of a load current in the embodiment of FIG. 15.

While T12≦T11 at the valley of |VAC|, there is an allowance of further lowering the load output as has been referred to, and the zero current turning ON still can be attained even when T12<T11. In FIG. 18, the load current Iz is shown, as shown in which the load current Iz is made small at the crest of |VAC|, and an average output power for 1 cycle of |VAC| can be reduced. Accordingly, it is possible to decrease the lower limit of the load output by causing the switching element commonly operated for the chopper CP and inverter INV to always attain the zero current turning ON and rendering the average output power for one cycle of the absolute value of the commercial source power voltage to be smaller than that when the ON duty is substantially constant. It should be appreciated that the present embodiment can be applied to other embodiments.

In FIG. 17, waveforms (a)–(d) show the switching operation of the switching elements Q1–Q4, and waveform (f) in FIG. 17 shows the chopper current ILO.

While in general the lower limit of the load output can be decreased with the zero current switching of the switching element Q2 being performed, there occurs a ripple in the load current Iz at the frequency of |VAC|. In another embodiment according to the present invention arranged as shown by a timing chart of FIG. 19, therefore, the occurrence of ripple is restrained by elevating the driving frequency of the switching elements Q1–Q4 to be higher at the crest of |VAC| than that at the valley thereof, as shown in waveforms (a)–(d) of FIG. 19.

Figure 19:
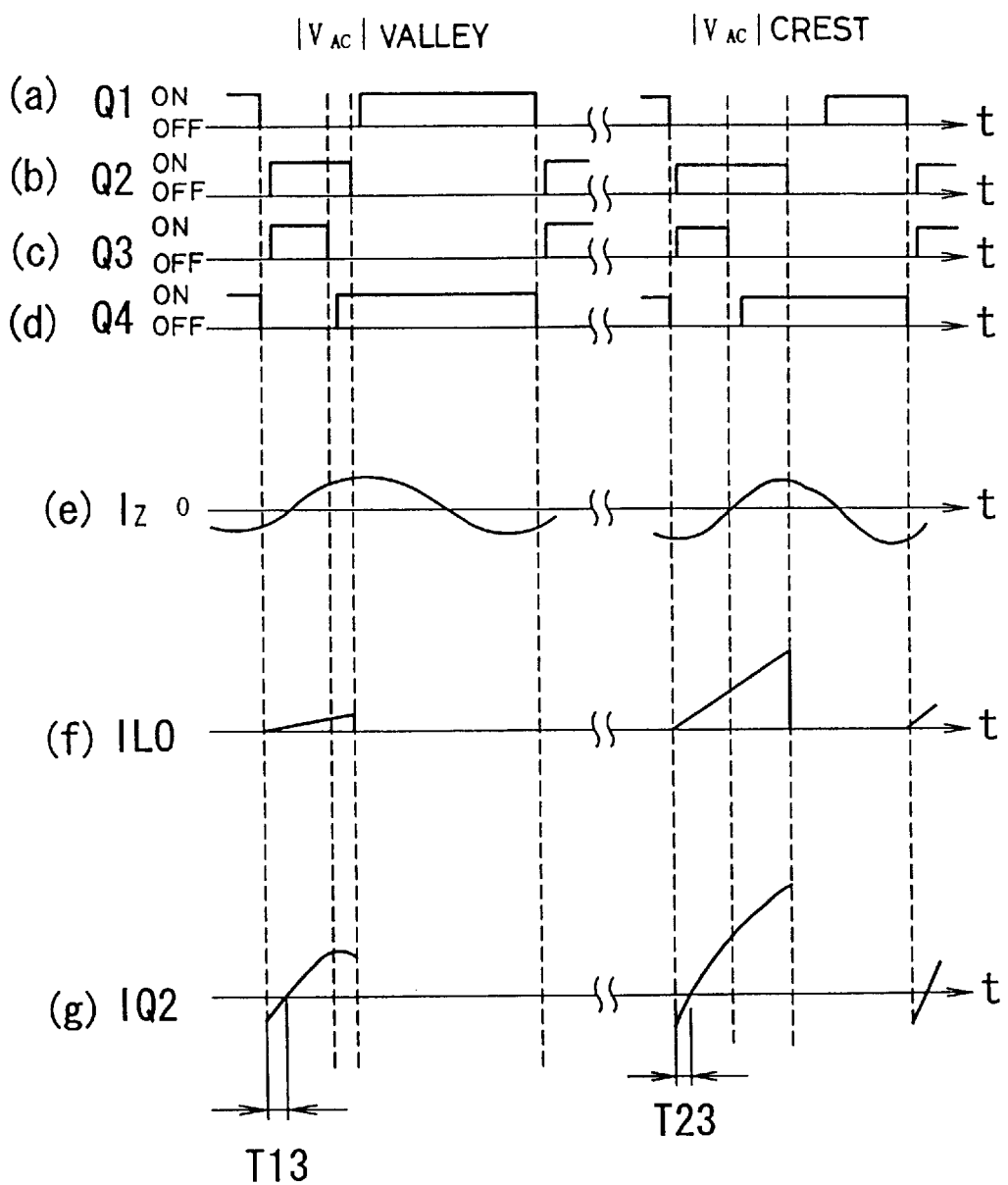
FIG. 19 is a timing chart with waveforms (a) to (g) for explaining the operation of another embodiment of the present invention.

That is, the driving frequency elevated is separated from the resonance frequency, and the load current Iz becomes smaller as shown in waveform (e) of FIG. 19. Therefore, the ripple occurring in the load current Iz at the cycle of |VAC| can be restrained to be small. Further, while the load current Iz becomes smaller, the operation of the switching element Q2 lags, further with respect to the driving signal therefor, so that the negative period T23 of the current IQ2 shown in waveform (g) of FIG. 19 can be secured to be more than the dead time period even when the load current Iz becomes smaller. Waveform (f) in FIG. 19 shows the chopper current ILO, and a period T14 shown in the waveform (g) of FIG. 19 corresponds to the period T11 of the waveform (g) of FIG. 16.

Figure 20:
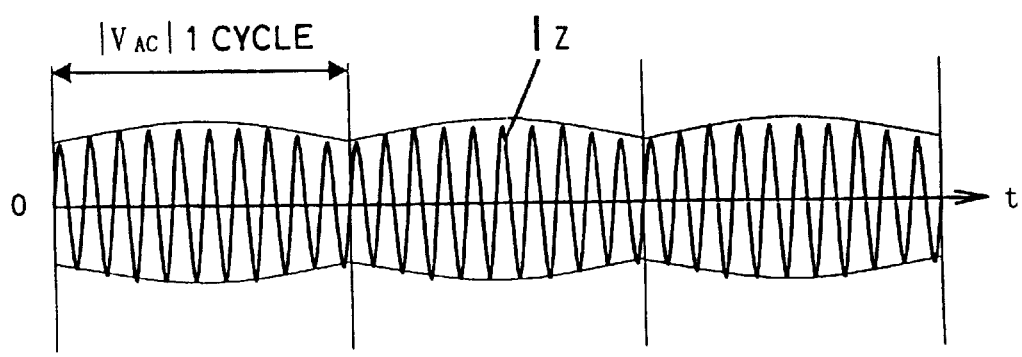
FIG. 20 is a waveform diagram of a load current in the embodiment of FIG. 19.

While examples of waveform of the load current Iz are shown in FIG. 20, the lower limit of the load output can be decreased as will be clear from this drawing, and the ripple of the load current Iz is reduced. In the present embodiment, therefore, there is an effect that the ripple of the load current Iz when the zero current turning ON operation of the switching element Q2 is maintained and the lower limit of the load output is decreased can be restrained, and a stable power can be supplied even when the output power is restricted. Specifically a flickering or the like occurring when the load in the resonance load circuit Z is a discharge lamp L can be reduced.

Figure 21:
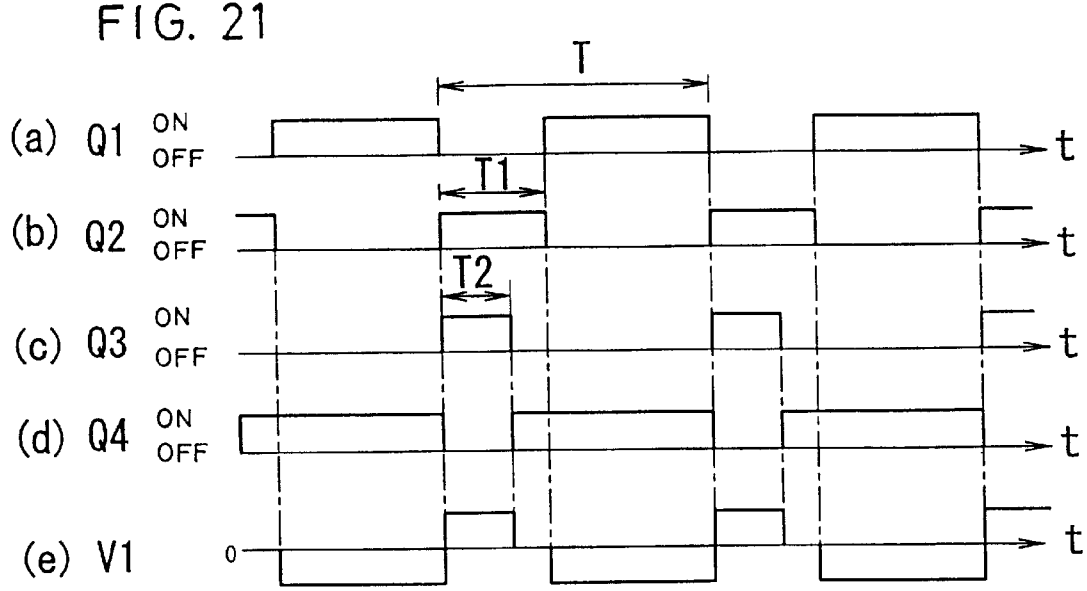
FIG. 21 is a timing chart with waveforms (a) to (e) for explaining the operation of another embodiment according to the present invention.
Figure 22:
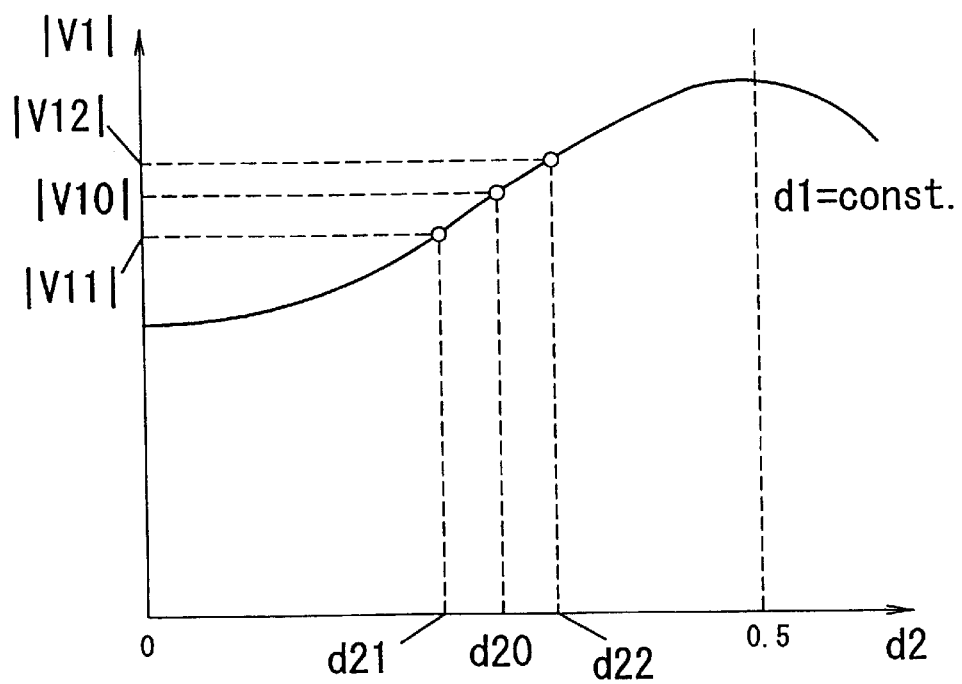
FIG. 22 is a diagram showing voltage-ON duty ratio characteristics for explaining the operation of the embodiment of FIG. 21.

In another embodiment according to the present invention performing such operation as shown in FIGS. 21 and 22, the load output is prevented from being caused to vary due to a deviation in an impedance multiple at the inductor L1 and capacitor C1 in the resonance load circuit Z, occurring even if the voltage DVC of a smoothing capacitor CO is constant and any deviation in the resonance frequency could be corrected. That is, the present embodiment is arranged for restraining such deviation.

In this case, in the present embodiment, the control is so made that the switching elements Q1 and Q2 as well as the switching elements Q3 and Q4 are alternately turned ON and OFF, as shown by waveforms (a)–(d) of FIG. 21, and the switching elements Q2 and Q3 mutually at the diagonal position are substantially equalized in the turning ON timing. Here, it is assumed that the ON duty ratio of the switching element Q2 is d1(=T1/T), and the ON duty ratio of the switching element Q3 is d2 (=T2/T).

FIG. 22 shows characteristics of an absolute value |V1| of the high frequency voltage (of waveform (e) in FIG. 21) applied to the resonance load circuit Z with respect to the ON duty ratio when the voltage Vdc of the smoothing capacitor CO and the ON duty ratio d2 are set constant. It is assumed here that the ON duty ratio d2 is d20 when the inductor L1 and capacitor CL of center value are employed, and that the absolute value |V1| at that time is |V10|.

In the event when L1/C1 is smaller than that at the center value, the load output is increased. Accordingly, it is possible to render the load output to be substantially equalized to that in the case of the inductor L1 and capacitor C1 at the center value, by decreasing the absolute value of the high frequency voltage, for example, from |V10| to |V11|. That is, any deviation in the load output can be restrained by decreasing the ON duty ratio of the switching element Q3, from the ON duty ratio d20 to the ON duty ratio d21, for example.

When to the contrary L1/C1 is larger than that at the center value, the load output is decreased, and the absolute value of the high frequency voltage is increased form |V10| to |V12|, for example. In other words, with the ON duty ratio d2 of the switching element Q3 increased to the ratio d22, the deviation of the load output can be prevented from occurring. In the present embodiment, further, the ON duty ratio d1 of the switching element Q2 may be adjusted while keeping the ON duty ratio d2 of the switching element Q3 constant.

In addition, in the event where the switching elements Q1 and Q2 mutually at the diagonal position are substantially equalized in the turning ON timing, it will be appreciated that the ON duty ratio of one of the switching elements Q1 and Q4 is kept constant and the ON duty ratio of the other element may be adjusted.

With the present embodiment as has been referred to employing the inverter INV of the full bridge arrangement, it is possible to regulate the load output over a wide range without involving any of the switching elements Q1–Q4 in the hard switching operation, and to restrain any deviation in the load output due to the deviation in the impedance multiple of the inductor L1 and capacitor C1 of the resonance load circuit Z, by means of the adjustment of the ON duty ratio of one of the switching elements at the diagonal position and equalized in their turning ON timing.

Figure 23:
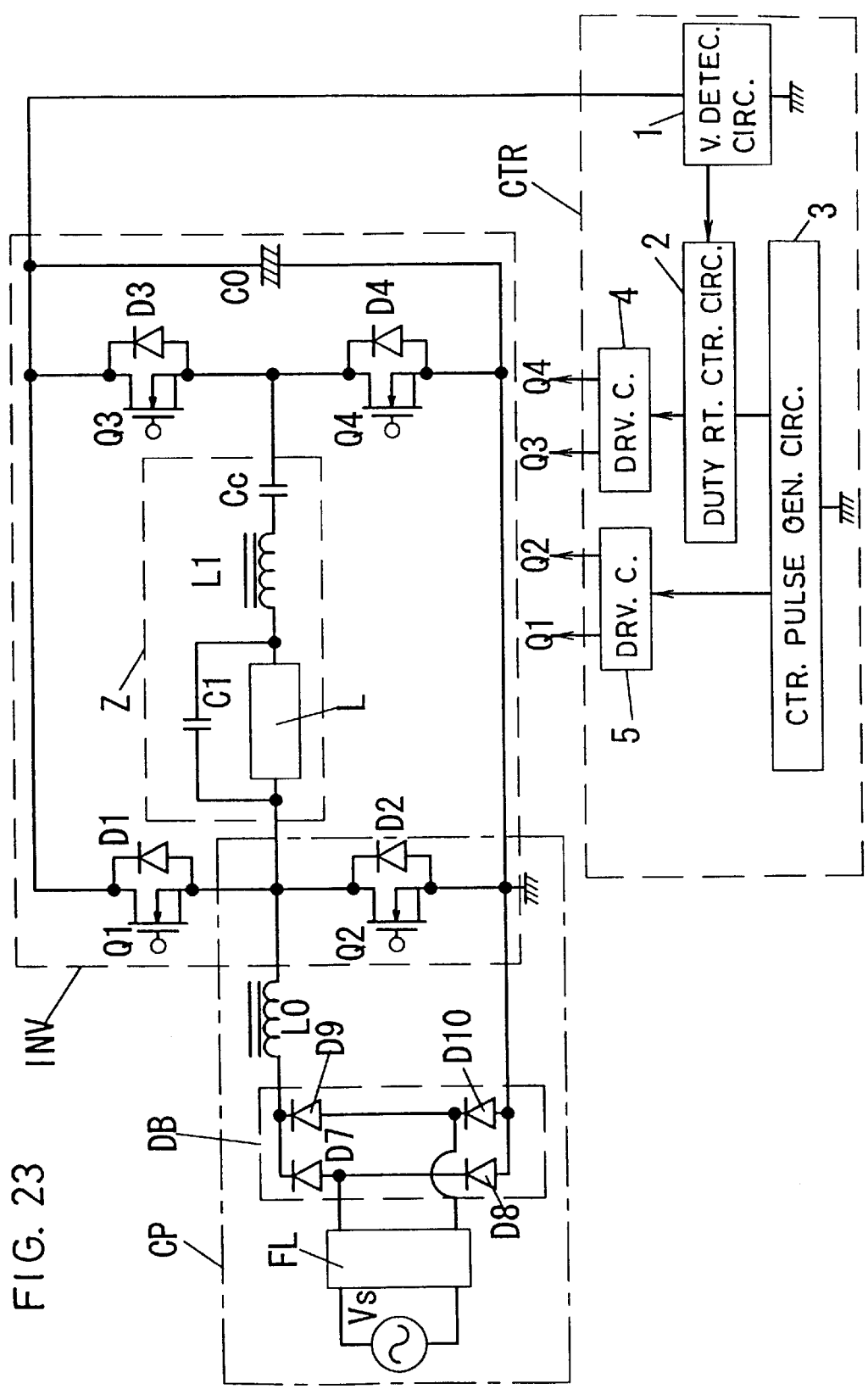
FIGS. 23 to 27 are circuit diagrams showing further embodiments of the present invention.

In another embodiment of the present invention as shown in FIG. 23, the inverter INV of the full bridge arrangement in which at least one of the switching elements, for example, the switching element Q2 operates as the common element to the chopper CP, is arranged for restraining the deviation of the load output due to the deviation in the impedance multiple of the inductor L1 and capacitor C1 in the resonance load circuit Z or the fluctuation in the load output due to the fluctuation of the load impedance. While the circuit is constituted basically for restraining the load output by adjusting the ON duty ratio of the one of the switching elements at the diagonal position and substantially equalized in the turning ON timing, the switching element Q2 in the inverter INV of the full-bridge arrangement is acting in common as the element of the chopper CP, so that, not only the load output but also a voltage Vdc of the smoothing capacitor CO is caused to deviate due to the deviation in the impedance multiple of the inductor L1 and capacitor C1 in the resonance load circuit Z or to fluctuate due to the fluctuation of the load impedance. When for example L1/C1 is smaller than that of the center value, the load output is increased to decrease the voltage Vdc, but, when L1/C1 is larger than that of the center value to the contrary, the load output is decreased and the voltage Vdc increases.

In this embodiment, there is provided a control circuit CTR which comprises a voltage detecting circuit 1 for detecting the voltage Vdc, a duty ratio control circuit 2 for controlling pulse signals from a control pulse generating circuit 3 such that any deviation in the impedance multiple or any fluctuation of the load impedance is equivalently detected on the basis of detection by the voltage detecting circuit 1 to render the ON duty ratio of one of the switching elements substantially equalized in the turning ON timing but on the side not used as the common element (here the switching element Q3) to be decreased to decrease the load output when the detected voltage Vdc is low, but to be increased to increase the load output when the detected voltage Vdc is high, and a drive circuit 4 providing signals the pulse signals received through the duty ratio control circuit 2 to the gates of the switching elements Q3 and Q4. Further, the control circuit CTR is provided with a drive circuit 5 for providing as drive signals the pulse signals from the control pulse generating circuit 3 as they are to the gates of the switching elements Q1 and Q2.

As based on the result of detection at the voltage detecting circuit 1, the duty ratio control circuit 2 controls the pulse signals from the control pulse generating circuit 3 so that, when the load output is to be lowered, the ON duty ratio of the switching element Q3 will be decreased and, when the load output is to be elevated, the ON duty ratio will be increased, and the controlled signals are provided through the drive circuit 4 to the switching element Q3 as its drive signals. Consequently, it becomes possible to restrain the fluctuation of the load output due to the fluctuation in the impedance multiple of the inductor L1 and capacitor C1 of the resonance load circuit Z.

As has been described, the present embodiment can establish the output control even in the power source device in which at least one of the switching elements Q1–Q4 in the inverter INV in the full bridge arrangement is operated as a common element of the chopper CP, by determining the ON duty ratio of one of the switching elements substantially equalized in the turning ON timing but on the side not used as the common element with the voltage Vdc of the smoothing capacitor CO detected.

Figure 24:
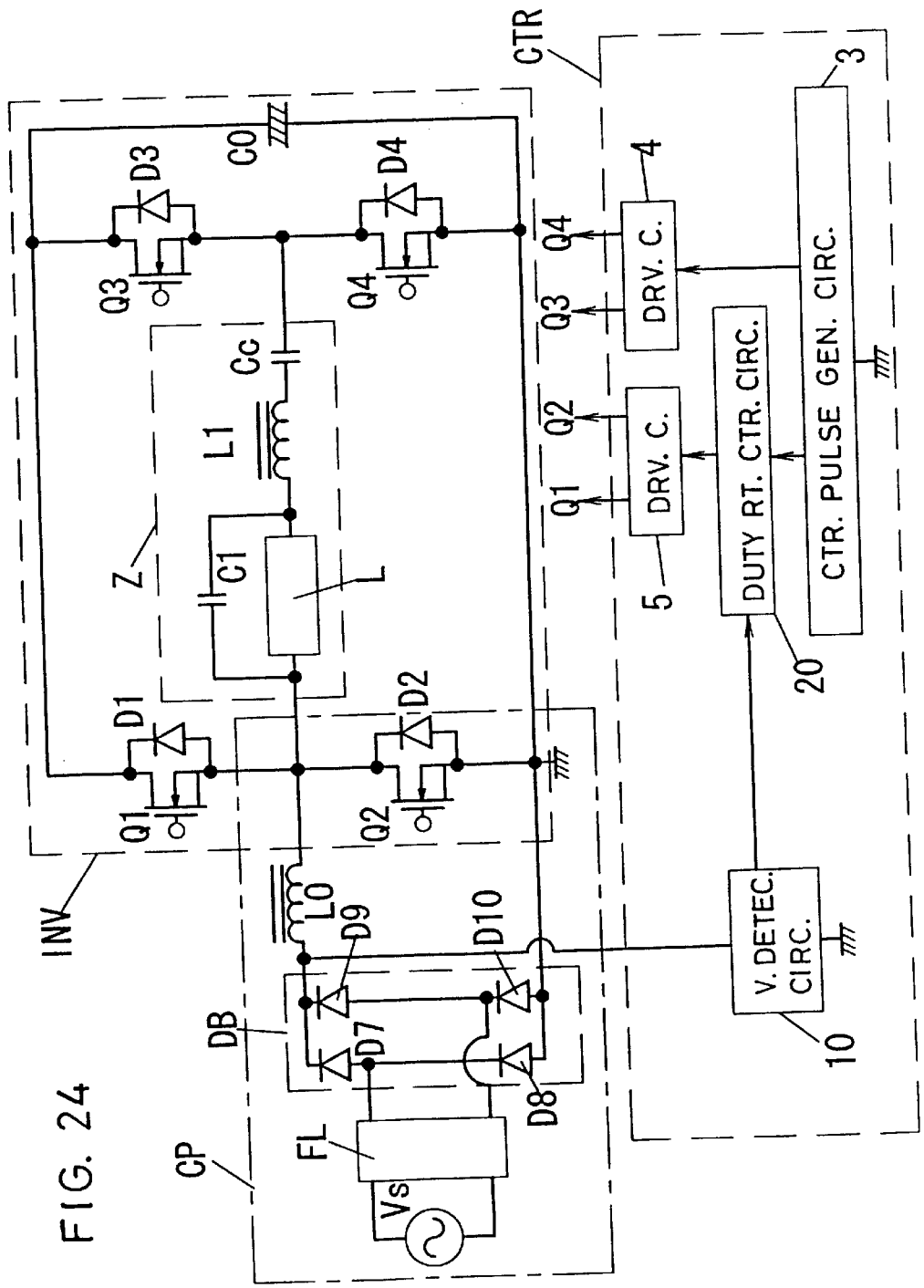

In another embodiment shown in FIG. 24 according to the present invention, the inverter INV and chopper CP of identical circuit arrangement to those in the foregoing embodiments are employed, but this embodiment is featured in that any fluctuation in the load output with respect to a fluctuation in the input voltage is to be restrained. In FIG. 24, constituents identical to those in the foregoing embodiments are denoted by the identical reference codes.

Here, the chopper CP operates to decrease the input current as the input voltage decreases, so that the input power decreases to lower the voltage Vdc of the smoothing capacitor CO and the load output is also decreased. When the input voltage increases on the other hand, the load output increases contrarily, so that the load output is to remarkably fluctuate due to the fluctuation in the input voltage.

In the present embodiment, therefore, the control circuit CTR is provided with a voltage detecting circuit 10 for detecting the input voltage after being rectified, a duty ratio control circuit 20 for controlling the pulse signals from the control pulse generating circuit 3 such that, when the input voltage detected by the detecting circuit 10 is low, the ON duty ratio of the switching element Q2 is increased by the duty ratio control circuit 3 to increase the input power and, when the input voltage detected is high, the ON duty ratio of the switching element Q2 is decreased to also decrease the input power, and a drive circuit 5 for providing the pulse signals received from the duty ratio control circuit 20 to the gates of the switching elements Q1 and Q2 as their drive signals. Further, the control circuit CTR is provided with a drive circuit 4 which receives the pulse signals from the control pulse generating circuit 3 and provides these signals as received to the gates of the switching elements Q1 and Q2.

Now, as based on the result of the detection by the voltage detecting circuit 10, the duty ratio control circuit 20 controls the pulse signals from the control pulse generating circuit 3 so that, when the input voltage is low, the ON duty ratio of the switching element Q2 will be increased and, when the input voltage is high, the ON duty ratio of the switching element Q2 will be decreased, to have such controlled pulse signals provided through the drive circuit 5 to the switching element Q2 as its drive signals. Consequently, it is possible to increase the input power when the input voltage is low, but to decrease the input power when the input voltage is high, and, as a result, the fluctuation in the voltage Vdc of the smoothing capacitor CO can be decreased to restrain the fluctuation in the load output.

In the present embodiment as has been referred to, the fluctuation in the load output due to the fluctuation in the input voltage is made restrainable. It will be also clear that the present embodiment is applicable to any other embodiments.

Figure 25:
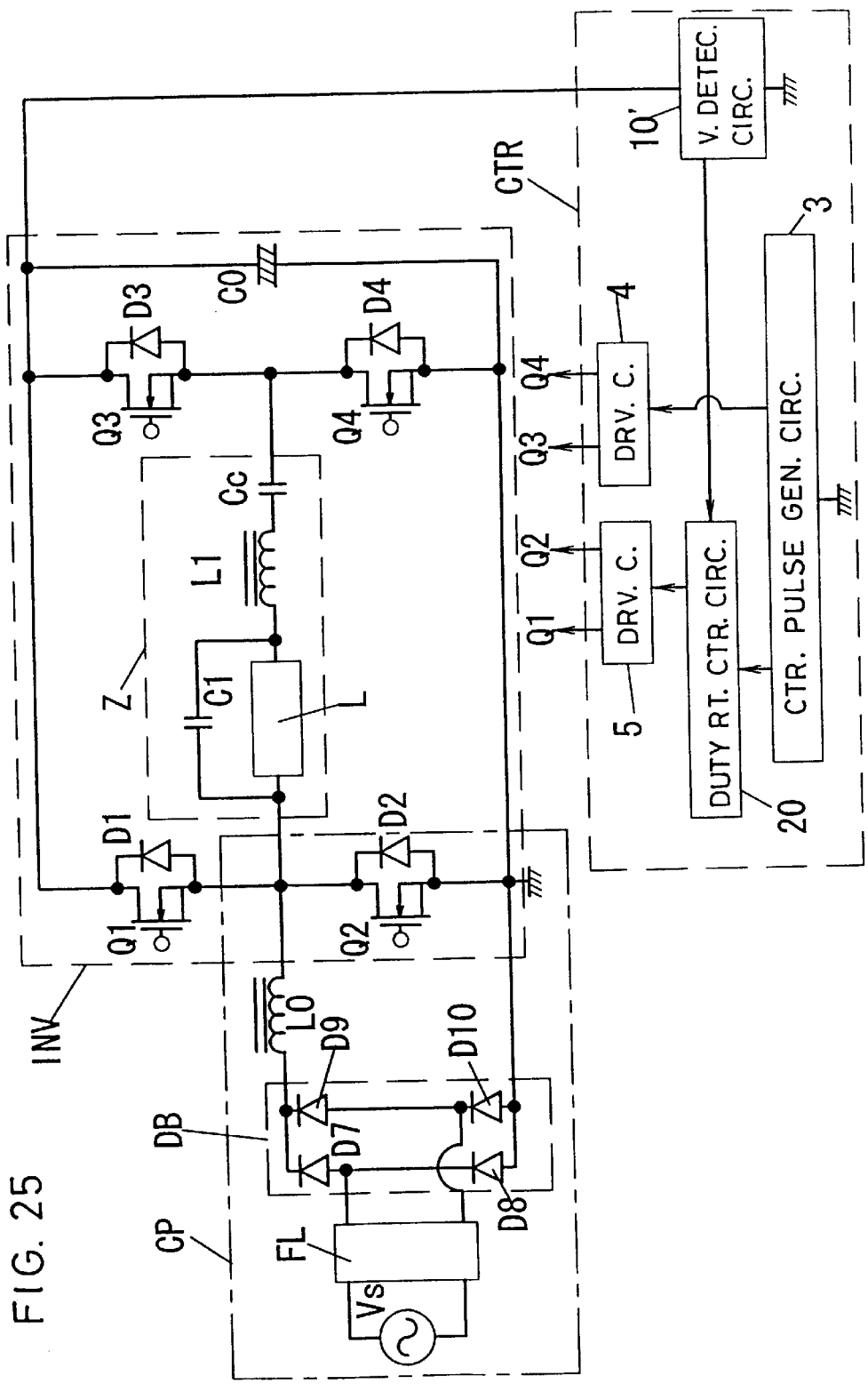

In another embodiment according to the present invention as shown in FIG. 25, the device is arranged for restraining the fluctuation in the load output in response to the fluctuation in the input voltage, and a voltage detecting circuit 10' is provided for detecting the voltage Vdc of the smoothing capacitor CO. The pulse signals from the control pulse generating circuit 3 are controlled by the ON duty ratio control circuit 20 such that, when the voltage Vdc detected by the voltage detecting circuit 10' is low, the ON duty ratio of the switching element Q2 is increased to increase the input power and, when the input voltage is high, the ON duty ratio of the switching element Q2 is decreased to decrease the input power, the thus controlled signals are provided to the switching element Q2 through the drive circuit 5 as the drive signals, and the fluctuation in the load output is restrained by restraining the voltage Vdc of the smoothing capacitor CO.

Further, this embodiment is also possible to restrain the fluctuation in the load output due to the fluctuation in the input voltage.

Other arrangements than those in the foregoing are identical to the arrangement in the foregoing embodiments, and the identical constituents are denoted by the identical reference codes.

Figure 26:
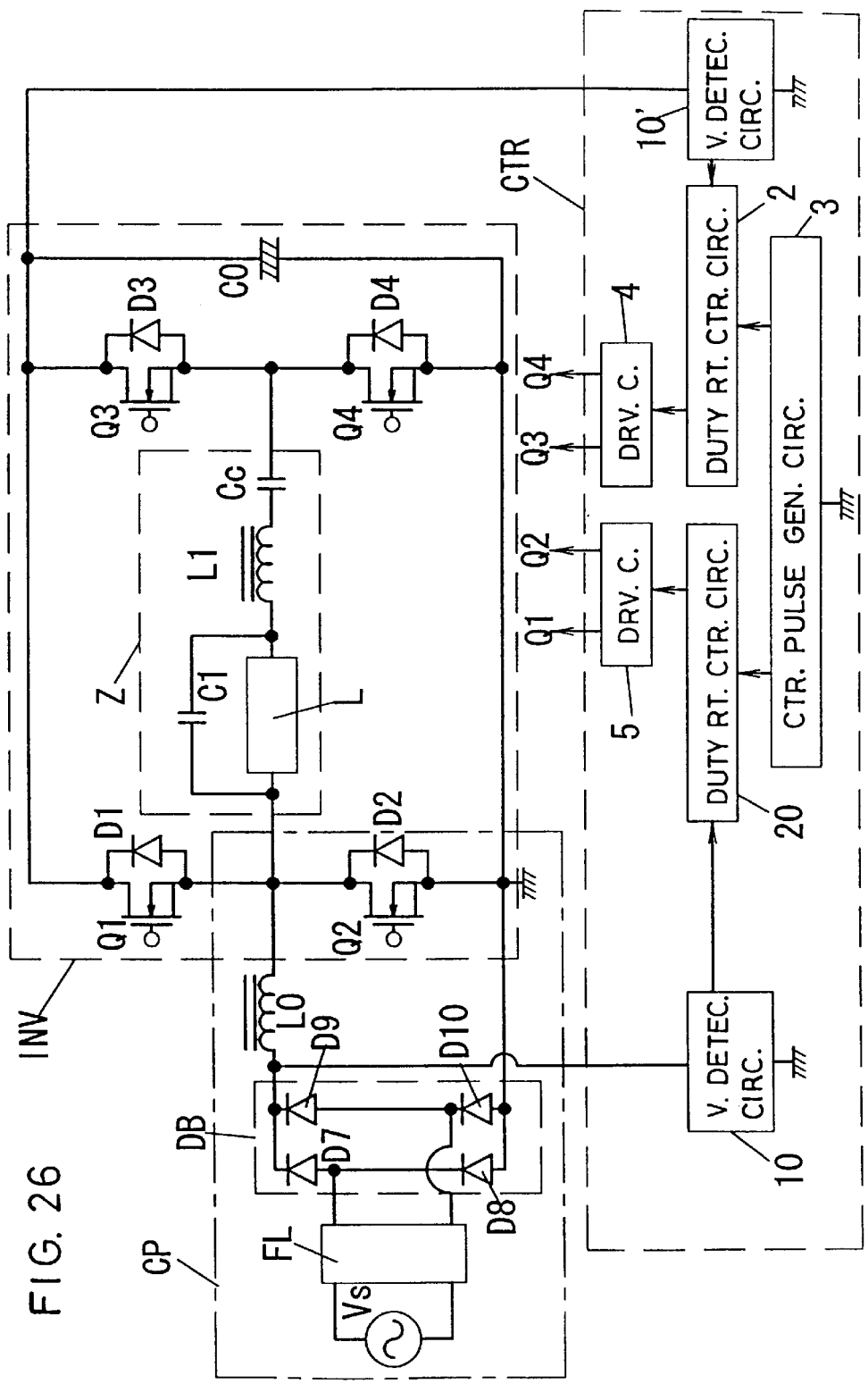

In another embodiment according to the present invention as shown in FIG. 26, the arrangement is so made that the fluctuation in the load output due to the fluctuation in the input voltage is restrained by means of the ON duty ratio of the switching element Q2 operated commonly as the element in the chopper CP, and the deviation in the load output due to the deviation in the impedance multiple of the inductor L1 and capacitor C1 of the resonance load circuit Z or the fluctuation in the load output due to the fluctuation of the load impedance is restrained by means of the ON duty ratio of the switching element Q3 which is not operated commonly. With this embodiment, it is also possible to restrain the fluctuation in the load output due to the fluctuation in the input voltage, and the deviation in the load output due to the deviation in the impedance multiple of the inductor L1 and capacitor C1 in the resonance load circuit Z or the fluctuation in the load output due to the fluctuation of the load impedance can be also restrained.

Other arrangements than those in the foregoing of the present embodiment are the same as those in the foregoing embodiments, and identical constituents are denoted in FIG. 26 with identical reference codes.

Figure 27:
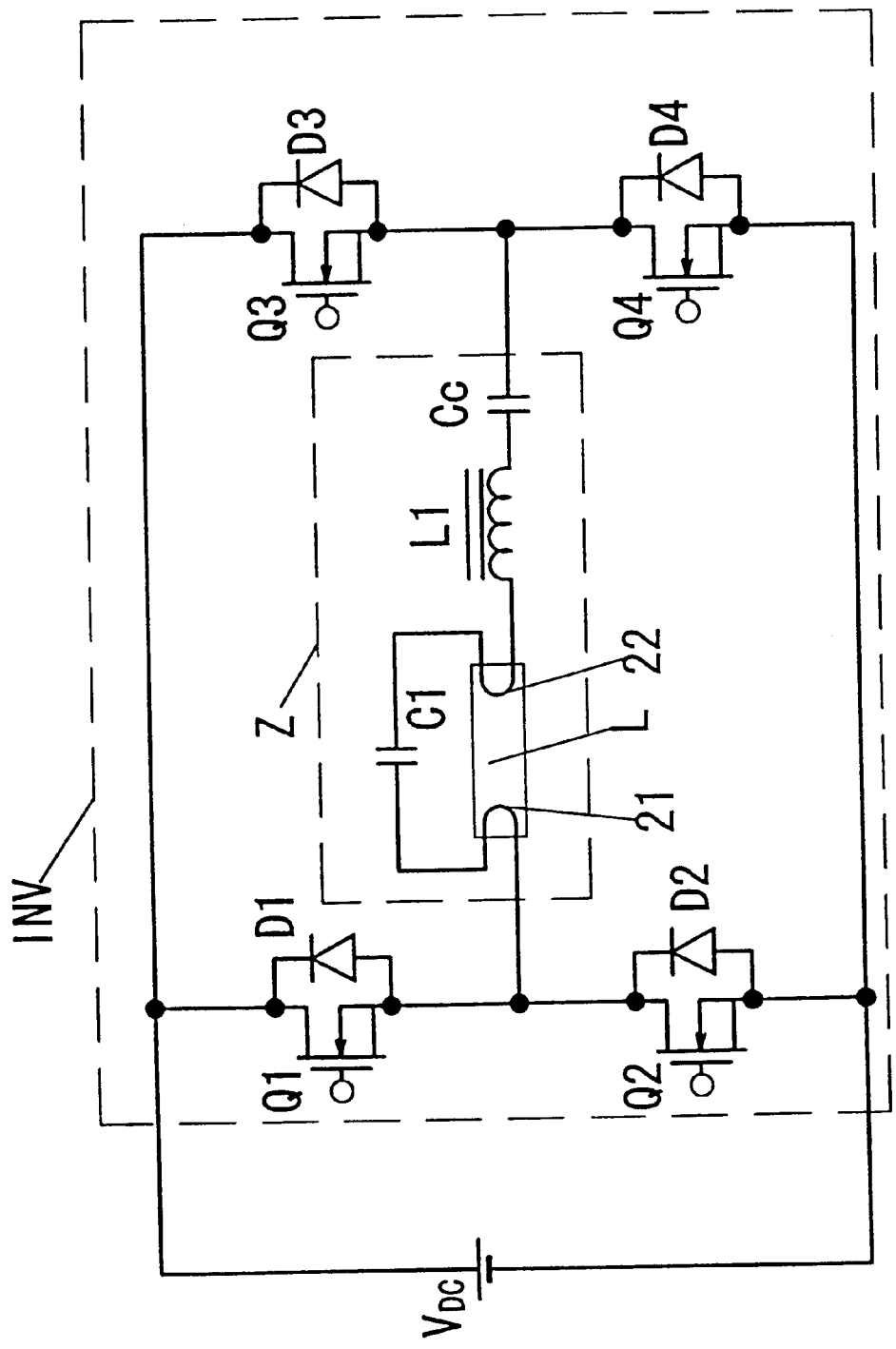

In another embodiment shown in FIG. 27 according to the present invention, the device is featured in that, in particular, a small diametered fluorescent lamp L is employed as the load in the resonance load circuit Z, and its filament electrodes 21 and 22 are preheated with the foregoing C-preheating circuit using one capacitor. That is, employed as the fluorescent lamp L is a circular fluorescent lamp of about 97 W in the rated lamp wattage, about 0.43 A in the rated lamp current and about 229V in the lamp voltage, or about 68 W in the rated lamp wattage, about 0.43 A in the rated lamp current and about 160V in the lamp voltage, which lamp is of a small diameter having about 1400–2500 mm in the discharge length and about 18–29 mm in the tube diameter. The first filament electrode 21 of this fluorescent lamp L is connected at one end to function point of Q1 and Q2 and at the other end to an end of the capacitor C1, the second filament electrode 22 is connected at one end to the other end of the capacitor C1 and these connections are included in the LC resonance circuit, while the other end of the second filament electrode 22 is connected to an end of the inductor L1. Other constituents are the same as those in the foregoing embodiments and are denoted by the same reference codes in FIG. 27, from which the illustration of the control circuit CTR is omitted.

As has been partly referred to in the foregoing, there has been a tendency that the fluorescent lamp is reduced in the diameter for the purpose of minimizing the size, attaining higher efficiency and saving natural resources, and coil wires for the filament electrodes in the fluorescent lamp L have been made further thin in order to secure a sufficient length within the lamp tube, so the filament current at lighting with respect to this fluorescent lamp L is subjected to a restriction for the purpose of securing the life of the filament electrodes, that is, the life of the fluorescent lamp L. In order to attend to a designing with the preheating circuit using one capacitor, therefore, it is required to keep the switching frequency upon dimmimg to be as low as possible.

In the present embodiment, therefore, the device is featured in that, in the dimming, the ON duty ratio d2 of the switching element Q3 is reduced to minimize the fundamental wave ratio in the voltage V1 applied to the resonance load circuit Z, so that the lighting can be attained at a frequency as low as possible for obtaining an identical load output. In concrete, in contrast to a dimming as shown in a diagram (a) of FIG. 28 in which the lamp is lighted at a frequency fd2 before decreasing the ON duty ratio d2, the dimming is performed by decreasing the On duty ratio d2 to lower the absolute value |V1| and the frequency is decreased to fd1 so that, as shown in a diagram (b) of FIG. 28, the lamp current Ila will be equal ($\alpha$ in the drawing) and the filament current If will be less than an upper limit $\beta$ at the time of the lighting.

Figure 28:
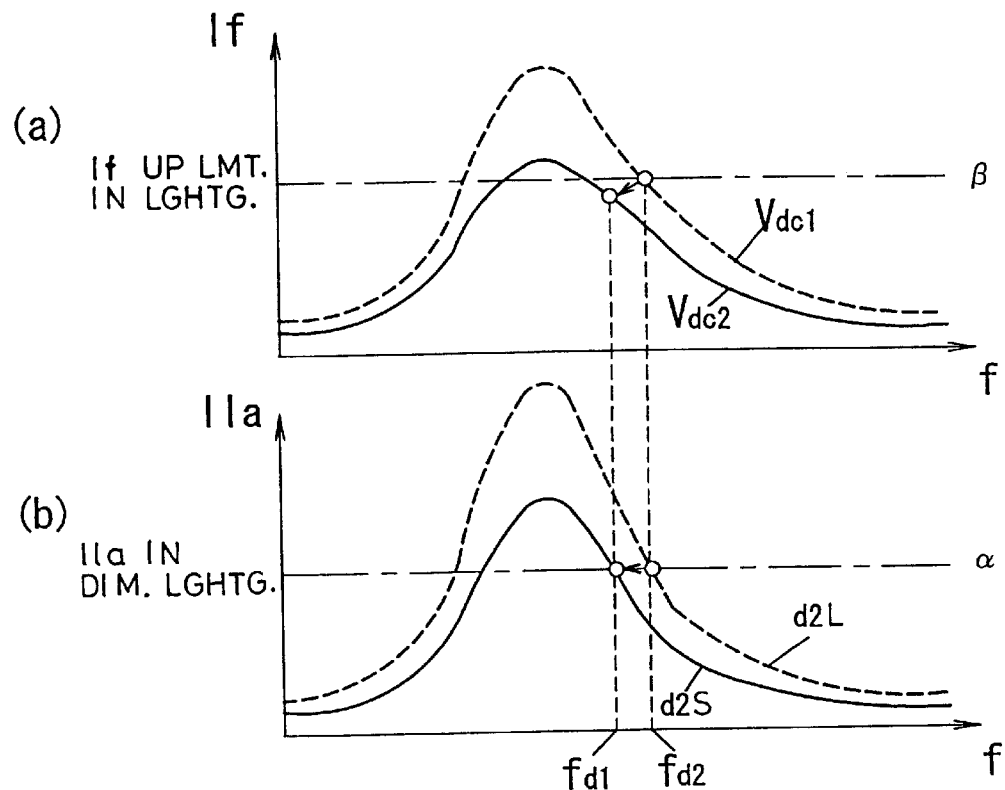
FIG. 28 is characteristic diagram with waveforms (a) and (b) for explaining the operation of the embodiment of FIG. 27.

Here, the diagrams (a) and (b) of FIG. 28 represent respectively frequency characteristics of the filament current If and of the lamp current Ila, in which characteristics curves of broken line are of the ON duty ratio d2 before being reduced and other characteristics curves of solid line are of the ratio d2 after being reduced. In the present embodiment, a smooth lighting of the fluorescent lamp L can be attained while satisfying the preheating conditions by the preheating circuit using one capacitor, even in the case where a thin diametered fluorescent lamp of preheating type is employed as the load. Further, as the filament current at lighting can be reduced, there arises an advantage that the circuit efficiency is improved.

Figure 29:
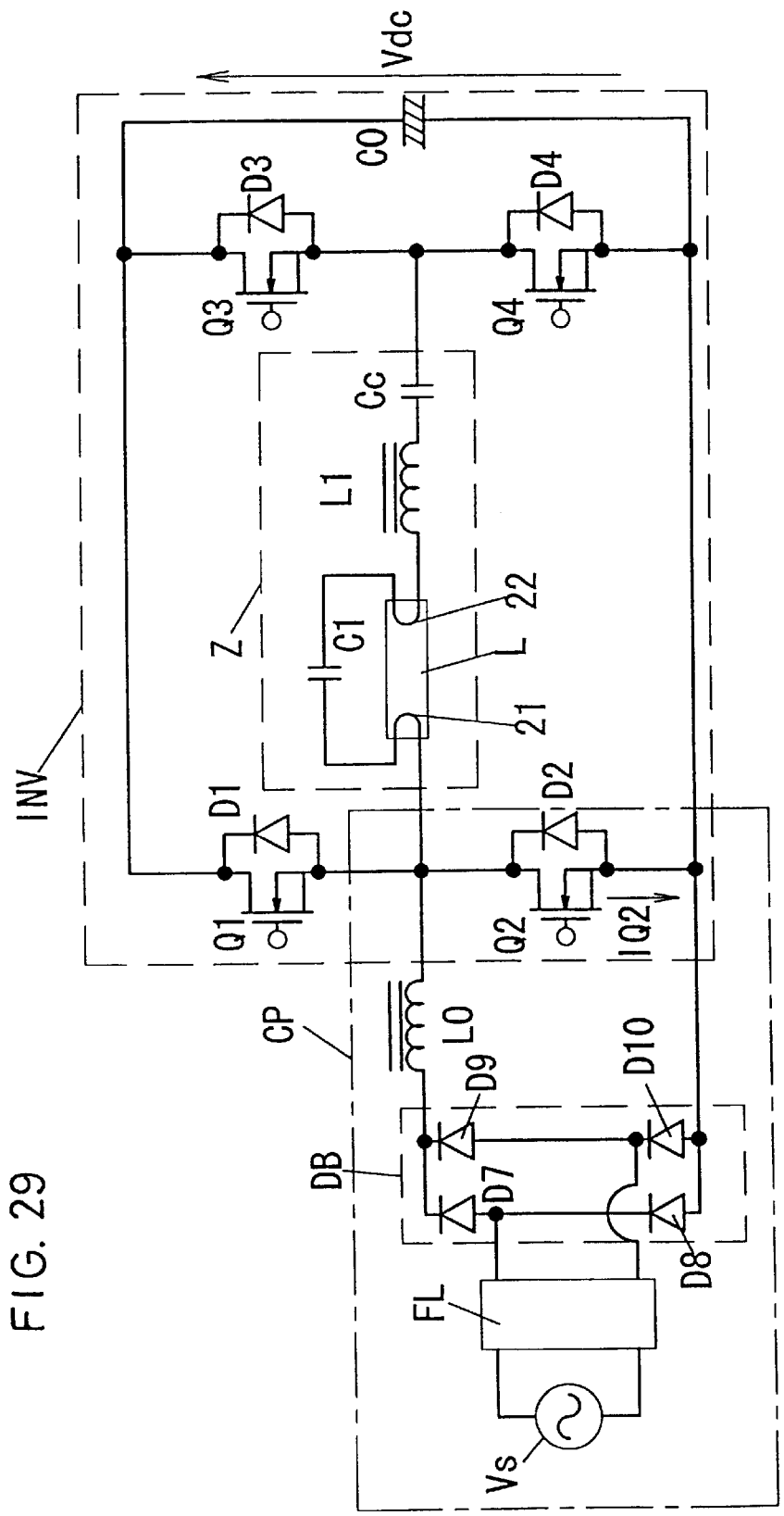
FIG. 29 is a circuit diagram showing another embodiment of the present invention.

In another embodiment of the present invention as shown in FIG. 29, the device is featured in that, in particular, the fluorescent lamp L of the small diameter is employed as the load in the resonance load circuit Z, and the preheating of the filament electrodes 21 and 22 is carried out with the foregoing preheating circuit using one capacitor. That is, a capacitor C1 is connected between non-source side ends of the filaments 21 and 22 of the preheating type fluorescent lamp L. Other arrangements are identical to those in the foregoing embodiments and the same constituents as those in the foregoing embodiments are denoted by the same reference codes.

Figure 30:
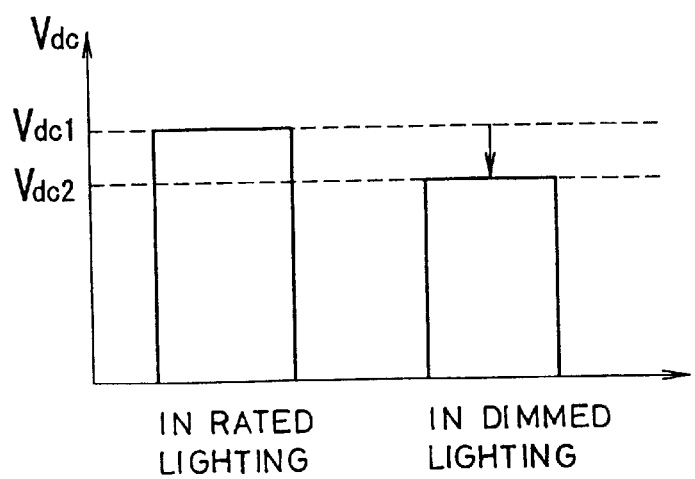
FIG. 30 is an explanatory diagram for the operation of the embodiment shown in FIG. 29.

In order to design the small diametered fluorescent lamp L with the preheating circuit using one capacitor, it is required to keep the switching frequency upon the dimming to be as low as possible. In the present embodiment, therefore, the voltage Vdc of the smoothing capacitor CO is lowered upon the dimming from a voltage Vdc1 for the rated operation to a voltage Vdc2 as shown in FIG. 30 by reducing the On duty ratio d1 of the switching element Q2 operated commonly for the chopper CP, so that the lighting can be realized at the frequency kept as low as possible for attaining the same load output, as shown in diagrams (a) and (b) of FIG. 31.

Figure 31:
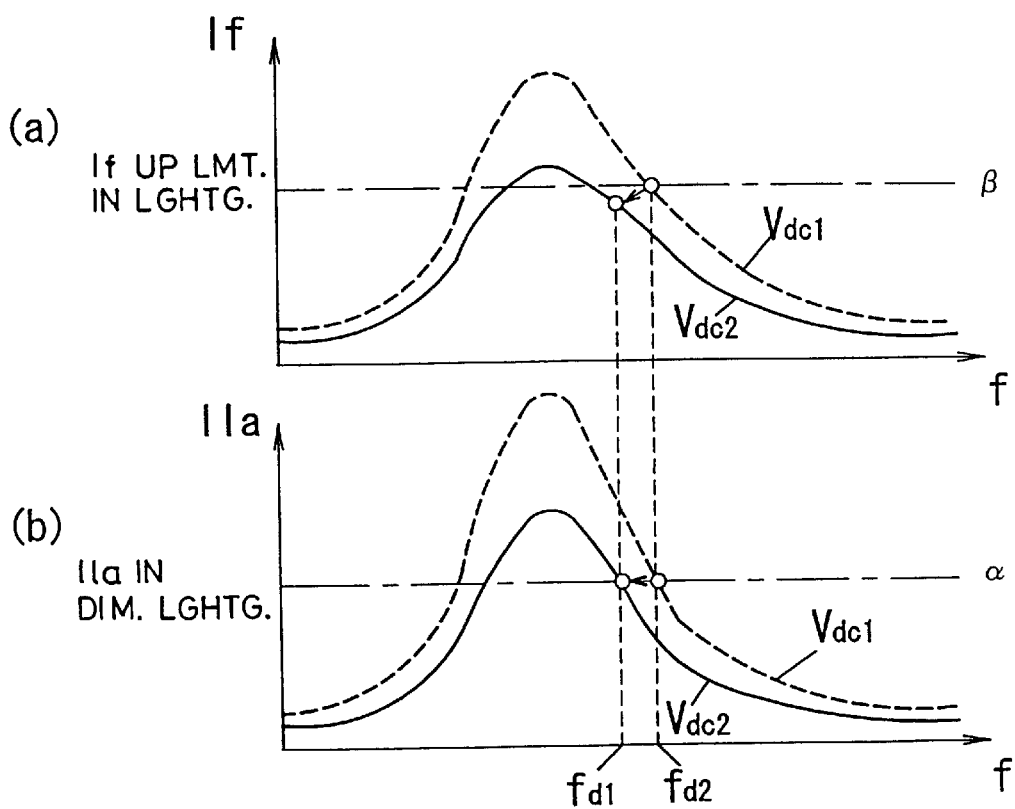
FIG. 31 is a characteristic diagram for explaining the operation of the embodiment of FIG. 29.

Here, the diagrams (a) and (b) of FIG. 31 represent the frequency characteristics of the filament current If and of the lamp current Ila, respectively, in which curves of broken line are of the voltage Vdc1 and other curves of solid line are of the voltage Vdc2, while $\beta$ denotes the upper limit of the filament current If upon lighting and $\alpha$ denotes the lamp current Ila upon dimming.

It will be clear that the arrangement of the present embodiment is applicable to other embodiments employing the inverter INV of the full bridge arrangement including the switching element or elements operated commonly for the chopper CP.

Figure 32:
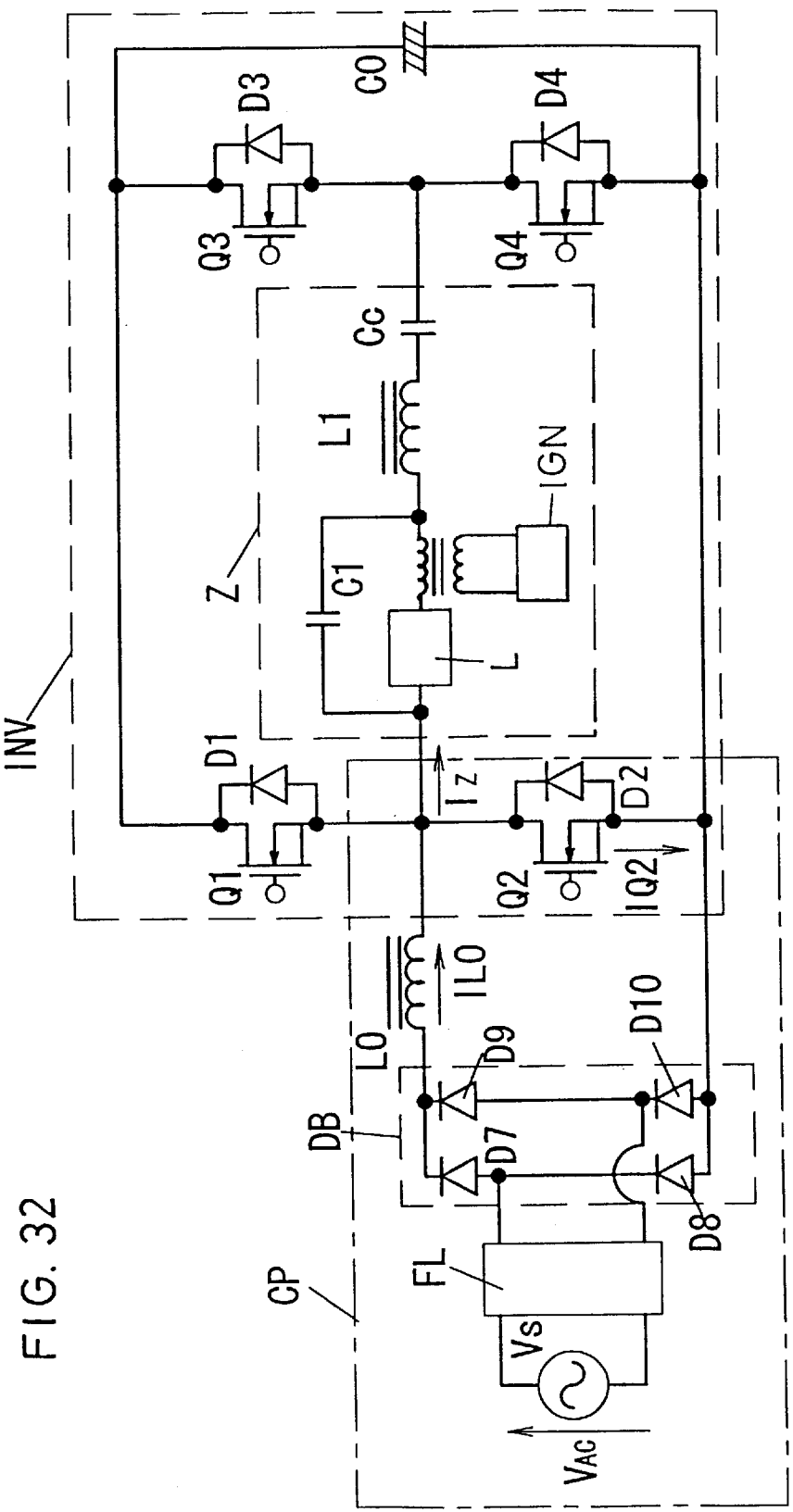
FIG. 32 is a circuit diagram showing still another embodiment of the present invention.

In another embodiment of the present invention as shown in FIG. 32, a high pressure discharge lamp L is employed in particular as the load in the resonance load circuit Z, consequent to which the circuit Z is provided additionally with an igniting circuit IGN for the high pressure discharge lamp L. In this case, the switching frequency of the high pressure discharge lamp L is set to be one at which the lamp L does not cause acoustic resonance, and the load output is to be stabilized by controlling the ON duty ratio of the switching elements Q3 and Q4.

In FIG. 32, the same circuit constituents as those in the foregoing embodiments are denoted by the same reference codes.

What is claimed is:

1. A power source device wherein two series circuits respectively of two switching elements are connected in parallel to a smoothing capacitor, a resonance circuit comprising at least an LC resonance circuit and a load is connected between both junction points of the switching elements in each of the two parallel circuits, a series circuit of a rectifying circuit for rectifying a source power from power source and an inductor is connected across one optional switching element in the two series circuits to employ the optional switching element as a chopper-common switching element performing a switching operation which causes a chopper circuit operation enabled, and a chopper diode is connected in inverse parallel to the other switching element series connected to the chopper-common switching element, characterized in that all switching elements are operated substantially at an equal switching frequency while respective switching elements in each series circuit are alternately turned ON and OFF, a timing of turning ON of the switching element in one of the two series circuits and connected to a low potential side of the smoothing capacitor is substantially equalized to a timing of turning ON of one switching element in the other series circuit and connected to a high potential side of the smoothing capacitor, and an ON duty ratio of at least one of the switching elements substantially equalized in the turning ON timing is reduced to lower an output to the load.

2. A power source device wherein two series circuits respectively of two switching elements are connected in parallel to a smoothing capacitor, a resonance circuit comprising at least an LC resonance circuit and a load is connected between both junction points of the switching elements in each of the two parallel circuits, a circuit of series connection of two rectifying diodes is connected in parallel across the smoothing capacitor, and a series circuit of at least power source and an inductor is connected between both junction points of the two rectifying diodes and of the switching elements in one of the series circuits so that the switching elements in the one series circuit are operated as chopper-common switching elements performing a chopper circuit operation alternately at every half cycle of a frequency of power from the commercial power source, characterized in that all switching elements are operated substantially at an equal switching frequency while respective switching elements in each series circuit are alternately turned ON and OFF, a timing of turning ON of the switching element in one of the two series circuits and connected to a low potential side of a DC source is substantially equalized to a timing of turning ON of the switching element connected to a high potential side of the smoothing capacitor, and an ON duty ratio of at least one of the switching elements substantially equalized in the turning ON timing is reduced to lower an output to a load.

3. The device according to claim 1 wherein the turning ON timing of the chopper-common switching element is substantially equalized to the turning ON timing of the switching element in the other series circuit connected to the opposite potential of the smoothing capacitor.

4. The device according to claim 1 wherein the ON duty ratio of the chopper-common switching element is made smaller at lower restricted voltage of the power source than that at higher.

5. The device according to claim 4 wherein a switching frequency of the switching elements is made higher at higher absolute value of a voltage of the power source than that at lower.

6. The device according to claim 1 wherein a turning ON timing of the switching element in one of the two series circuits and connected to a low potential side of the smoothing capacitor is substantially equalized to the turning ON timing of the switching element in the other series circuit and connected to a higher potential side of the smoothing capacitor, and the ON duty ratio of the switching element not of the chopper-common side in the above is increased when an impedance multiple of the inductor and capacitor in an LC resonance circuit is large, but is decreased when the multiple is small.

7. The device according to claim 1 wherein the ON duty ratio of the chopper-common switching element is decreased when the absolute value of the voltage of the power source is small, but is increased when the absolute value is large.

8. The device according to claim 1 wherein the load is a discharge lamp.

9. The device according to claim 8 wherein the discharge lamp is of about 1400–2500 mm in discharge length and about 18–29 mm in tube diameter.

10. The device according to claim 8 wherein the discharge lamp is a circular fluorescent lamp of about 97 W in rated lamp wattage, about 0.43 A in rated lamp current, and about 229V in lamp voltage.

11. The device according to claim 8 wherein the discharge lamp is a circular fluorescent lamp of about 68 W in rated lamp wattage, about 0.43 A in rated lamp current, and about 160V in lamp voltage.

12. The device according to claim 8 wherein the discharge lamp is a high pressure discharge lamp.

13. The device according to claim 9 wherein the LC resonance circuit is connected to one end of each first and second filament electrode of the discharge lamp, the other end of the first and second filament electrodes are connected to each ends of a capacitor for preheating.

14. The device according to claim 13 wherein the ON duty ratio of the chopper-common switching element is decreased at dimming for operation in a lower switching frequency, and to restrict filament current at lighting to be below an upper limit value.

15. The device according to claim 13 wherein the turning-ON timing of the switching element in the one series circuit and connected on lower potential side of the smoothing capacitor is substantially equalized to the turning-ON timing of the switching element in the other series circuit and connected to higher potential side of the smoothing capacitor, and the ON duty ratio of one of these switching elements which is other than the chopper-common element is decreased at dimming for operation in a lower switching frequency.

* * * * *